(12) United States Patent
Hara et al.

(10) Patent No.: US 10,949,035 B2
(45) Date of Patent: Mar. 16, 2021

(54) METHOD CARRIED OUT BY STYLUS, METHOD CARRIED OUT BY DUAL STYLUS AND DUAL CONTROLLER, AND DUAL STYLUS

(71) Applicant: Wacom Co., Ltd., Saitama (JP)

(72) Inventors: Hideyuki Hara, Tokyo (JP); Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/227,783

(22) Filed: Dec. 20, 2018

(65) Prior Publication Data

US 2019/0121455 A1    Apr. 25, 2019

Related U.S. Application Data

(63) Continuation of application No. PCT/JP2016/069705, filed on Jul. 1, 2016.

(51) Int. Cl.
*G06F 3/0354* (2013.01)
*G06F 3/038* (2013.01)
(Continued)

(52) U.S. Cl.
CPC .............. *G06F 3/0441* (2019.05); *G06F 3/03* (2013.01); *G06F 3/0383* (2013.01);
(Continued)

(58) Field of Classification Search
CPC .... G06F 3/03545; G06F 3/03; G06F 3/04162; G06F 3/0383; G06F 3/0446; G06F 2203/0382; G06F 2203/0384
See application file for complete search history.

(56) References Cited

U.S. PATENT DOCUMENTS 8,536,471 B2    9/2013 Stern et al.
9,218,070 B2   12/2015 Oda et al.
(Continued)

FOREIGN PATENT DOCUMENTS

JP    4-353918 A    12/1992
JP    2011-138180 A    7/2011
(Continued)

OTHER PUBLICATIONS

International Search Report, dated Aug. 16, 2016, for International Application No. PCT/JP2016/069705, 5 pages (with English translation).

*Primary Examiner* — Md Saiful A Siddiqui
(74) *Attorney, Agent, or Firm* — Seed IP Law Group LLP

(57) ABSTRACT

A method is carried out by a stylus, wherein the stylus is a dual stylus configured to be capable of transmitting signals pursuant to both a first system and a second system and receiving at least a signal pursuant to the first system. The dual stylus has a detection function of detecting a writing pressure applied to a stylus (pen) tip. The method includes detecting contact between the stylus and a touch surface based on the writing pressure detected by the detection function, activating a signal reception operation pursuant to the first system for a predetermined time period, and, responsive to reception of a signal pursuant to the first system in the predetermined time period, setting an operation mode of the stylus to a first operation mode, in which signals are transmitted and received pursuant to the first system.

18 Claims, 23 Drawing Sheets

(51) Int. Cl.
  *G06F 3/044* (2006.01)
  *G06F 3/03* (2006.01)
  *G06F 3/041* (2006.01)

(52) U.S. Cl.
  CPC ........ *G06F 3/03545* (2013.01); *G06F 3/0442* (2019.05); *G06F 3/04162* (2019.05); *G06F 3/0446* (2019.05)

(56) References Cited

U.S. PATENT DOCUMENTS

| | | | |
|---|---|---|---|
| 9,383,839 B1* | 7/2016 | Rost | G06F 3/03545 |
| 2012/0105362 A1 | 5/2012 | Kremin et al. | |
| 2014/0002422 A1* | 1/2014 | Stern | G06F 3/03545 |
| | | | 345/179 |
| 2014/0078101 A1 | 3/2014 | Katsurahira | |
| 2015/0277587 A1* | 10/2015 | Chandran | G06F 21/445 |
| | | | 345/173 |
| 2016/0195944 A1* | 7/2016 | Gur | G06F 3/03545 |
| | | | 345/174 |
| 2016/0320918 A1 | 11/2016 | Hara | |
| 2017/0315631 A1* | 11/2017 | Pourbigharaz | G06F 3/0416 |
| 2018/0181222 A1 | 6/2018 | Ivanov | |

FOREIGN PATENT DOCUMENTS

| | | |
|---|---|---|
| JP | 2014-63249 A | 4/2014 |
| JP | 5913759 B1 | 4/2016 |
| WO | 2015/111159 A1 | 7/2015 |

* cited by examiner

METHOD CARRIED OUT BY STYLUS, METHOD CARRIED OUT BY DUAL STYLUS AND DUAL CONTROLLER, AND DUAL STYLUS

BACKGROUND OF THE INVENTION

1. Field of the Invention

The present disclosure relates to a method carried out by a stylus, a method carried out by a dual stylus and a dual controller, and a dual stylus.

2. Description of the Related Art

In recent years, electronic equipment including a stylus that transmits a signal by using capacitive coupling has been attracting attention as an input device. This kind of electronic equipment further includes a touch sensor and a sensor controller, and the sensor controller is configured to receive a signal from the stylus received through the touch sensor and carry out position detection and writing pressure detection of the stylus based on the received signal.

Regarding the above-described electronic equipment, electronic equipment of various systems have come into existence in recent years. Concrete examples thereof are disclosed in PCT Patent Publication No. WO2015/111159, Japanese Patent Laid-Open No. 2014-63249, U.S. Pat. No. 8,536,471, and U.S. Patent Application Publication No. 2012-0105362 (hereinafter, Patent Documents 1 to 4, respectively).

In Patent Document 1, electronic equipment of a so-called active capacitive system is disclosed, in which detection of the existence and position of a stylus is enabled by using electrodes prepared in a touch panel in order to carry out finger detection. A sensor controller according to this example does not have a signal transmission function, and transmission of signals is carried out only in one direction from the stylus to the sensor controller.

Electronic equipment of the active capacitive system is disclosed also in Patent Document 2. A sensor controller according to this example has a signal transmission function, and transmission of signals is carried out bi-directionally between a stylus and the sensor controller.

Another example in which transmission of signals is carried out only in one direction from a stylus to a sensor controller is disclosed in Patent Document 3, and another example in which transmission of signals is carried out bi-directionally between a stylus and a sensor controller is disclosed in Patent Document 4.

As above, electronic equipment of various kinds of systems exist as electronic equipment including a stylus. However, generally, compatibility does not exist among the respective systems. As a result, in the past, for example when a user lays electronic equipment compatible with only a first system and electronic equipment compatible with only a second system side by side and attempts to use them alternately, the user would need to change (switch) the styluses every time the electronic equipment are switched, which has been inconvenient.

SUMMARY OF THE INVENTION

In view of the above-described situation, applicant has been researching on introduction of a stylus and a sensor controller compatible with plural systems. Hereinafter, the stylus and the sensor controller compatible with plural systems will be referred to as a dual stylus and a dual controller, respectively. For example, in the above-described example, the need to change the styluses every time the electronic equipment are switched is eliminated by using the dual stylus compatible with both the first system and the second system.

During the research, applicant has discovered that the dual stylus and the dual controller may encounter the following problems. A detailed description will be made below.

First, there is a problem that a long time is often necessary from contact between the dual stylus and a touch surface to decision of the operation mode of the dual stylus. If the sensor controller has a function of transmitting a signal from the touch surface, the dual stylus can determine the type of the sensor controller by receiving the signal before coming in contact with the touch surface.

However, signal reception by the dual stylus and signal transmission by the sensor controller both need to be intermittent. Thus, when operation of the user is quick, or the like, the dual stylus often comes in contact with the touch surface in the state in which the stylus has not yet received the signal from the sensor controller. In such a case, input by the dual stylus cannot be made for a while after the contact with the touch surface (until the timing of signal reception by the dual stylus and the timing of signal transmission by the sensor controller next coincide with each other), resulting in causing user inconvenience.

Second, there is a problem that the dual stylus and the dual controller do not necessarily operate in the optimum operation mode when they are used in combination. The plural systems with which the dual stylus and the dual controller are compatible are not prepared as completely-parallel systems but they are actually assigned the order of priority. Specifically, suppose that a dual stylus and a dual controller compatible with a first system and a second system exist and a higher order of priority is set for the first system than the second system. In this case, in the case of carrying out communication between the dual stylus and the dual controller, which are both compatible with the first system, the communication should be carried out pursuant to the first system having a higher priority.

However, for example if both the dual stylus and the dual controller each carry out transmission and reception of signals pursuant to the first system and the second system intermittently, they may recognize that their operation counterpart is equipment compatible with the second system, depending on the timing. In such a case, communication pursuant to the second system is started and communication pursuant to the first system is not carried out.

Furthermore, for example if the first system with the higher order of priority is compatible with bidirectional communication and the second system with the lower order of priority is compatible with unidirectional communication from the stylus to the sensor controller, it is conceivable that the dual stylus is operated pursuant to the second system upon detection of the writing pressure in order to rapidly implement rendering when touch operation is carried out. In this case, communication pursuant to the first system is not carried out.

Therefore, the present disclosure provides a method carried out by a stylus, a method carried out by a dual stylus and a dual controller, and a dual stylus that can solve the above-described problems relating to the dual stylus and the dual controller.

A method carried out by a dual stylus according to the present disclosure is a method carried out by a dual stylus that is configured to be capable of transmitting both a signal pursuant to a first system and a signal pursuant to a second system and is configured to be capable of receiving at least a signal pursuant to the first system. The dual stylus has a detection function of detecting a writing pressure applied to a pen tip. The method includes detecting contact between the dual stylus and a touch surface based on the writing pressure detected by the detection function, starting reception operation of the signal pursuant to the first system in response to detection of contact between the dual stylus and the touch surface, and, if a signal pursuant to the first system is received in the reception operation, setting an operation mode of the dual stylus to a first operation mode, in which signals are transmitted and received pursuant to the first system.

A method carried out by a dual stylus and a dual controller according to the present disclosure is a method carried out by a dual stylus that is configured to be capable of transmitting both a signal pursuant to a first system and a signal pursuant to a second system and is configured to be capable of receiving at least a signal pursuant to the first system, and a dual controller that is configured to be capable of receiving both a signal pursuant to the first system and a signal pursuant to the second system and is configured to be capable of transmitting at least a signal pursuant to the first system. The method includes transmitting, by the dual stylus, a first signal pursuant to the second system, wherein the first signal includes function information indicating that the dual stylus is compatible with the first system. The method includes transmitting, by the dual controller, a second signal including an instruction to switch to a first operation mode, in which signals are transmitted and received pursuant to the first system, in response to reception of the first signal from the dual stylus. The method includes switching, by the dual stylus, an operation mode of the dual stylus to the first operation mode in response to reception of the second signal from the dual controller.

A dual stylus according to one aspect of the present disclosure is a dual stylus that is configured to be capable of transmitting both a signal pursuant to a first system and a signal pursuant to a second system and is configured to be capable of receiving at least a signal pursuant to the first system. The dual stylus includes a detector having a detection function of detecting a writing pressure applied to a pen tip and a controller that activates a signal reception operation pursuant to the first system for a predetermined time period in response to detection of contact between the dual stylus and a touch surface based on the writing pressure detected by the detection function. The controller, when a signal is received pursuant to the first system in the predetermined time period, sets an operation mode of the dual stylus to a first operation mode, in which signals are transmitted and received pursuant to the first system.

A dual stylus according to another aspect of the present disclosure is a dual stylus that is configured to be capable of transmitting both a signal pursuant to a first system and a signal pursuant to a second system and is configured to be capable of receiving at least a signal pursuant to the first system. The dual stylus includes a controller that transmits a first signal pursuant to the second system, wherein the first signal includes function information indicating that the dual stylus is compatible with the first system. The controller, after transmitting the first signal, in response to reception of a second signal from a sensor controller, wherein the second signal is indicative of an instruction to switch to a first operation mode, switches an operation mode of the dual stylus to the first operation mode, in which signals are transmitted and received pursuant to the first system.

A dual stylus according to another aspect of the present disclosure is a dual stylus that is configured to be capable of transmitting both a signal pursuant to a first system and a signal pursuant to a second system and is configured to be capable of receiving at least a signal pursuant to the first system. The dual stylus includes an indicator, and a controller that determines whether operation is to be carried out in a first operation mode, in which the signal pursuant to the first system is transmitted, or operation is to be carried out in a second operation mode, in which the signal pursuant to the second system is transmitted, and controls the indicator to carry out indication differently between when the determined operation mode is the first operation mode and when the determined operation mode is the second operation mode.

According to the methods carried out by the stylus in accordance with the present disclosure, the stylus can start the reception operation of the signal pursuant to the first system immediately after contact with the touch surface. Therefore, it becomes possible to shorten the time from the contact with the touch surface to setting the stylus to the first operation mode.

Furthermore, according to the methods carried out by the dual stylus and the dual controller in accordance with the present disclosure, even when the operation mode of the dual stylus is the second operation mode in which transmission (and reception) of the signal pursuant to the second system is carried out, the operation mode of the dual stylus can be switched to the first operation mode by an instruction from the dual controller that has ascertained that the dual stylus is compatible with the first system. Therefore, it becomes possible to start communication pursuant to the first system between the dual stylus and the dual controller.

DETAILED DESCRIPTION OF THE PREFERRED EMBODIMENTS

Embodiments of the present disclosure will be described in detail below with reference to the accompanying drawings.

Figure 1:
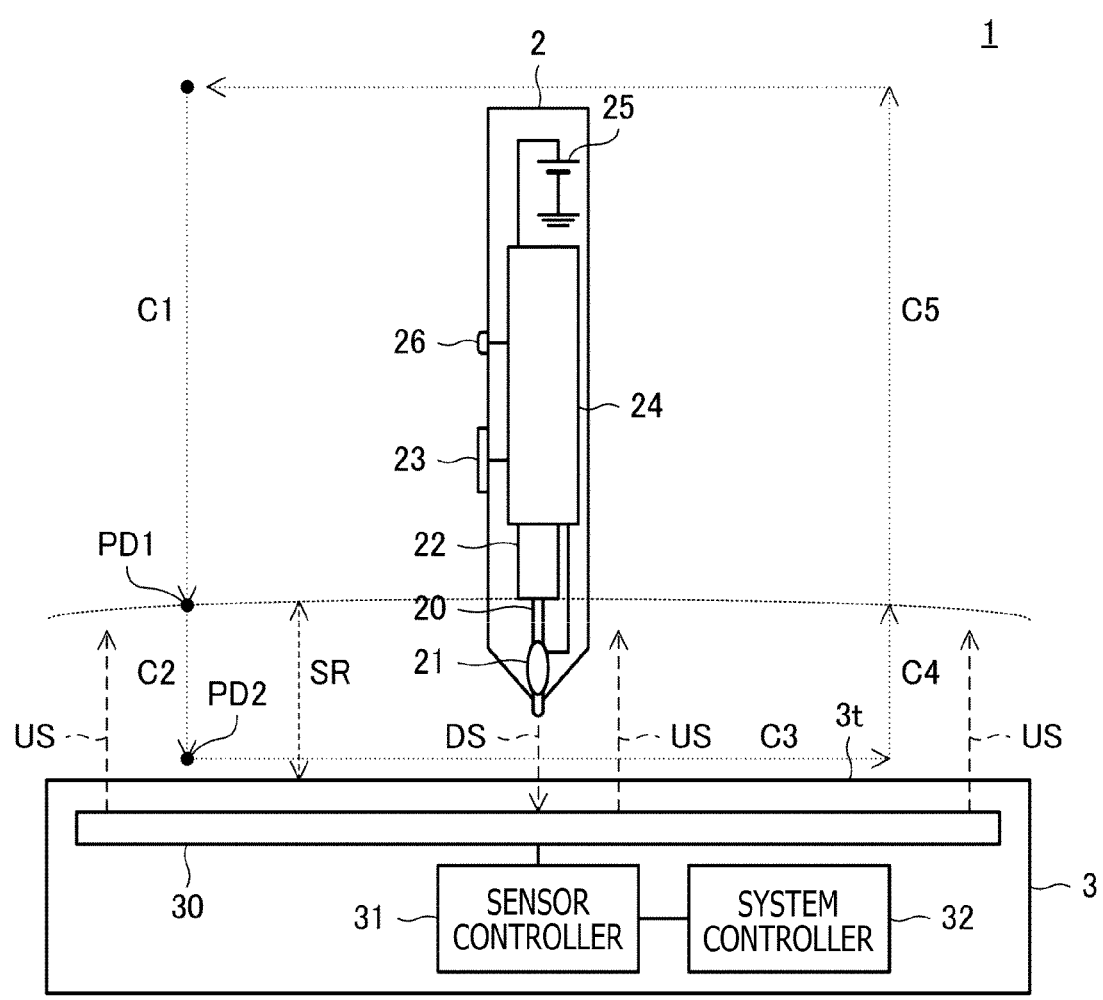
FIG. 1 is a diagram depicting the configuration of a position detecting system according to an embodiment of the present disclosure.

FIG. 1 is a diagram depicting the configuration of a position detecting system 1 according to a first embodiment of the present disclosure. As depicted in this diagram, the position detecting system 1 includes a stylus 2 and electronic equipment 3. The electronic equipment 3 is a tablet-type computer for example, and has a sensor 30 forming a touch surface 3t, a sensor controller 31, and a system controller 32 that controls the respective elements of the sensor controller 31.

The stylus 2 and the sensor controller 31 are a dual stylus and a dual controller, respectively, compatible with system A (first system) and system B (second system) that do not have compatibility with each other. Systems A and B are both compatible with bidirectional communication between the stylus 2 and the sensor controller 31. Systems A and B are given the order of priority and a higher order of priority is set for system A than system B.

Dashed arrows C1 to C5 in FIG. 1 represent a typical cycle of operation of the stylus 2 by a user. Furthermore, a sensing range SR depicted in FIG. 1 represents a range in which either one of the stylus 2 and the sensor controller 31 can detect the other through reception, by the stylus 2, of an uplink signal US transmitted by the sensor controller 31 or reception, by the sensor controller 31, of a downlink signal DS transmitted by the stylus 2.

When drawing a line on the touch surface 3t by using the stylus 2, a user repeats a series of cycle in which the stylus 2 is moved (down) from outside of the sensing range SR to inside of the sensing range SR (C1, C2) and is moved to draw a desired trace on the touch surface 3t (C3) and thereafter is moved (up) from inside of the sensing range SR to outside of the sensing range SR (C4, C5). In the present specification, the entry of the stylus 2 into the sensing range SR in down-operation will be referred to as first pen-down PD1 and a contact with the touch surface 3t by the stylus 2 will be referred to as second pen-down PD2.

As depicted in FIG. 1, the stylus 2 has a core body 20, an electrode 21, a writing pressure detector 22, a switch 23, a signal processor (processing circuit) 24, a power supply 25, and an indicator 26.

The core body 20 is an elongated member disposed in such a manner that the longitudinal direction thereof corresponds with the pen axis direction of the stylus 2, and forms the pen tip of the stylus 2. An electrically-conductive material is applied on the surface of the tip part of the core body 20 and forms the electrode 21. The rear (proximal) end part of the core body 20 is made to abut against the writing pressure detector 22. The writing pressure detector 22 detects the writing pressure level according to the pressure applied to the tip of the core body 20 (writing pressure applied to the core body 20) when the pen tip of the stylus 2 is pressed against the touch surface 3t of the sensor controller 31 or the like. In a concrete example, the writing pressure detector 22 is formed of a variable-capacitance module whose capacitance changes according to the writing pressure.

The electrode 21 is an electrical conductor disposed near the core body 20 and is electrically connected to the signal processor 24 by wiring. When the stylus 2 transmits the downlink signal DS toward the sensor controller 31, the downlink signal DS is supplied from the signal processor 24 to the electrode 21 and, in response to this, a charge according to the contents of the downlink signal DS is induced in the electrode 21. This causes change in the capacitance in the sensor 30 to be described later and the sensor controller 31 receives the downlink signal DS by detecting this change. Furthermore, when the uplink signal US transmitted by the sensor controller 31 reaches the electrode 21, a charge according to the uplink signal US that has reached is induced in the electrode 21. The signal processor 24 receives the uplink signal US by detecting the charge thus induced in the electrode 21.

The switch 23 is a side switch disposed on the side surface of the casing of the stylus 2 for example, and functions as an input unit configured to be capable of accepting operation by the user. Specifically, the switch 23 is configured to, according to the state of operation by the user (pressed-down state), output switch information indicating its own pressed-down state to the signal processor 24. The switch information is information that indicates either one of two states of on-state and off-state, for example.

The signal processor 24 has a function of receiving the uplink signal US transmitted by the sensor controller 31 pursuant to system A or system B through the electrode 21, a function of generating the downlink signal DS pursuant to system A or system B and transmitting the downlink signal DS toward the sensor controller 31 through the electrode 21, and a function of detecting the second pen-down PD2 (contact with the touch surface 3t) based on the writing pressure level detected by the writing pressure detector 22. Which of systems A and B is used by the signal processor 24 is decided according to the operation mode of the stylus 2. This point will be described later.

As described later, the uplink signal US often includes various kinds of command, and the signal processor 24 in this case acquires the command by demodulating and decoding the received uplink signal US and generates the downlink signal DS in accordance with the acquired command. Specifically, based on an instruction by the command, the signal processor 24 generates the downlink signal DS including various kinds of information, such as the writing pressure level detected by the writing pressure detector 22 and the switch information output from the switch 23.

Furthermore, the signal processor 24 holds a unique identification (ID) of the stylus 2 in a memory, which is not depicted in the diagram. The unique ID is information used in common in the plural systems with which the stylus 2 is compatible (in this case, systems A and B), and includes information indicating the plural systems with which the stylus 2 is compatible. The signal processor 24 is configured to cause function information including all or part of this unique ID (including at least information sufficient for the sensor controller 31 to determine that the stylus 2 is compatible with system A) to be included in the downlink signal DS and transmit the downlink signal DS when being instructed by a command included in the uplink signal US or voluntarily at a timing according to any trigger including reception of the uplink signal US or the second pen-down PD2.

The power supply 25 is a unit configured to supply operating power (direct current voltage) to the signal processor 24 and is formed of an AAAA battery with a circular cylindrical shape, for example.

The indicator 26 is configured to inform (notify) a user of various kinds of information relating to the stylus 2, and is formed of a light emitting diode for example. The indicator 26 will be described in detail in a third embodiment to be described later.

Figure 2:
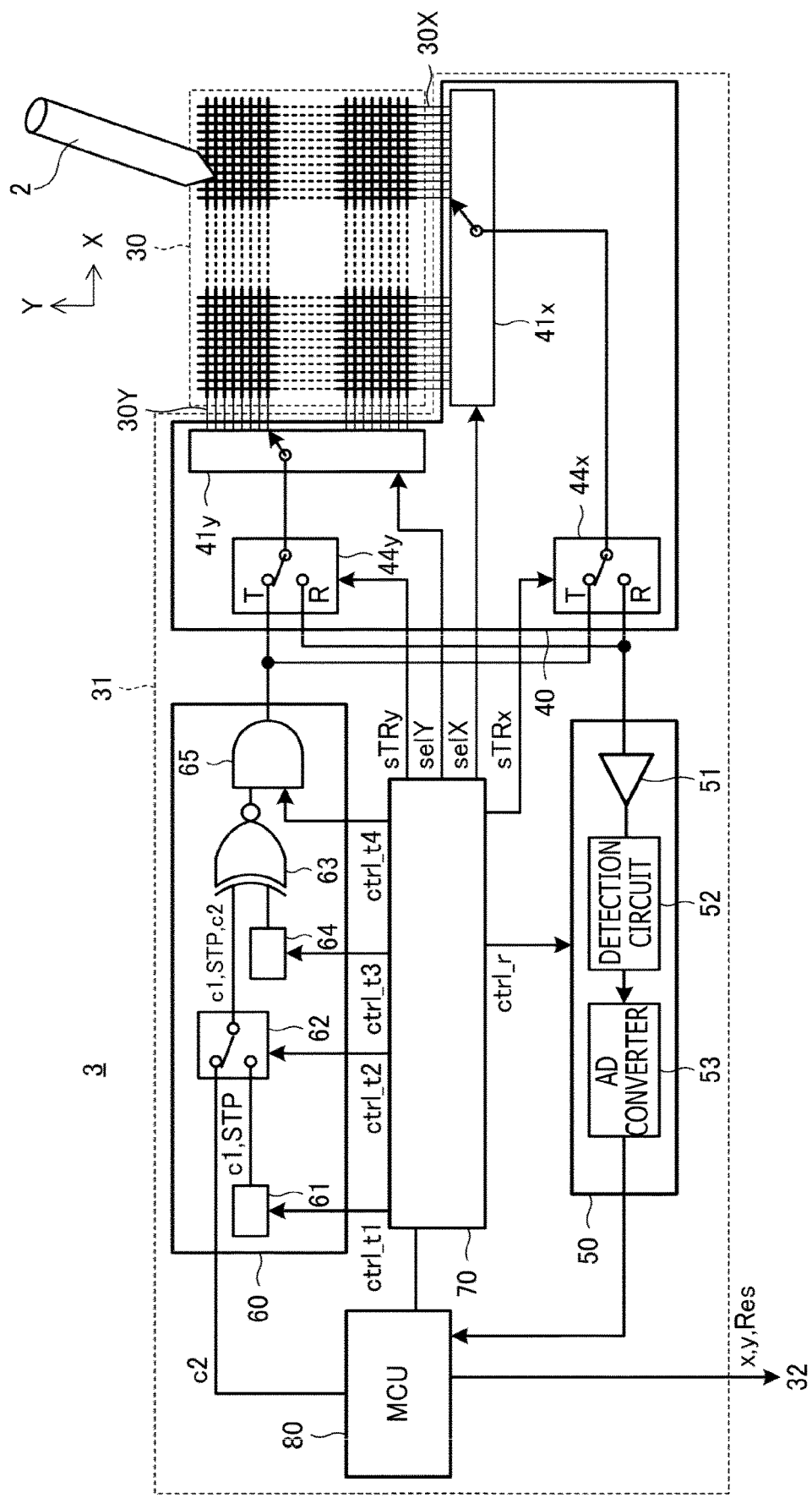
FIG. 2 is a diagram depicting the configuration of a sensor controller according to the embodiment of the present disclosure.

FIG. 2 is a diagram depicting the configuration of the sensor controller 31. The configuration of the sensor 30 is also depicted in this diagram. As depicted in this diagram, the sensor 30 has a configuration in which plural linear electrodes 30X and plural linear electrodes 30Y are disposed in a matrix manner and is capacitively coupled to the stylus 2 based on these linear electrodes 30X and 30Y. The sensor 30 is used for detection of not only the stylus 2 but also a finger. Furthermore, the sensor controller 31 includes a transmitter 60, a selecting circuit 40, a receiver 50, a logic unit 70, and a micro-controller unit (MCU) 80.

The transmitter 60 is a circuit configured to generate and transmit the uplink signal US pursuant to system A or system B and includes a pattern supply circuit 61, a switch 62, a spreading processor 63, a code string holding circuit 64, and a transmission guard circuit 65 for example. The concrete configuration of the transmitter 60 described here is exemplification and is different in some cases depending on the system. Furthermore, if systems A and B need the transmitters 60 with configurations different from each other, the respective configurations may be disposed together in one transmitter 60 and be selectively operated. Which of systems A and B is used by the transmitter 60 is decided according to the operation mode of the sensor controller 31. This point will be described later.

The pattern supply circuit 61 holds a detection pattern c1 and has a function of repeatedly outputting a signal (or bit string) corresponding to the detection pattern c1 consecutively during a predetermined consecutive transmission period (for example 3 milliseconds) in accordance with an instruction of a control signal ctrl_t1 supplied from the logic unit 70. Furthermore, the pattern supply circuit 61 also has a function of outputting a predetermined delimiter pattern STP at least twice consecutively immediately after the end of this consecutive transmission period or at the time of transmission start of control information c2 to be described later. The pattern supply circuit 61 may be disposed in the MCU 80 although being disposed in the transmitter 60 in FIG. 2.

The detection pattern c1 is a pattern of the values of symbols used for detection of the existence of the sensor controller 31 by the stylus 2 and is made known to the stylus 2 in advance (before the stylus 2 detects the sensor controller 31). The symbol is the unit of information used for modulation in transmission processing (unit of information expressed by a transmission signal) and is the unit of information obtained by demodulating one symbol that is a received signal in reception processing. The values of the symbol can include a value converted to a bit string (hereinafter, referred to as "bit string corresponding value") and a value that is not converted to a bit string by the stylus 2 that has received the symbol (hereinafter, referred to as "bit string non-corresponding value"). As depicted in Table 1 to be described later, the symbols relating to the former take a power-of-two number of values and can be associated with bit strings of "0001" and so forth. The bit length of each symbol represented by a bit string in this manner is decided depending on the specifications of the spreading processor 63. On the other hand, the symbols relating to the latter take one or more (for example two) values and take values that are represented as "P," "M," or the like, and are not associated with a bit string as depicted in Table 1 to be described later. In one example depicted in Table 1 to be described later, "P" and "M" are associated with a predetermined spreading code string and an inverted code string thereof, respectively.

The detection pattern c1 is represented by a pattern of the bit string non-corresponding value. Specifically, the detection pattern c1 is formed of repetition of two bit string non-corresponding values "P" and "M" as in "PMPMPM . . . ."

The delimiter pattern STP is a pattern of the symbols for notifying the stylus 2 of the end of the above-described consecutive transmission period and is formed of a pattern of the symbols that does not appear in repetition of the detection pattern c1. To take one example, if the detection pattern c1 is formed of repetition of two bit string non-corresponding values "P" and "M" as in "PMPMPM . . . " as described above, the delimiter pattern STP can be formed of a pattern "PP" obtained by making the bit string non-corresponding value "P" consecutive twice. The configurations of the delimiter pattern STP and the detection pattern c1 may be reversed, so that the delimiter pattern may be formed of "PM" and the detection pattern c1 may be formed of "PP."

The switch 62 has a function of selecting either one of the pattern supply circuit 61 and the MCU 80 based on a control signal ctrl_t2 supplied from the logic unit 70 and supplying output of the selected one to the spreading processor 63. If the switch 62 selects the pattern supply circuit 61, the detection pattern c1 or the delimiter pattern STP is supplied to the spreading processor 63. On the other hand, if the switch 62 selects the MCU 80, the control information c2 is supplied from the MCU 80 to the spreading processor 63.

The control information c2 is information including a command indicating the contents of an instruction to the stylus 2 and is generated by the MCU 80. The control information c2 includes the value of the symbol (for example 0 to 15) associated with a bit string with a variable length, and is different from the detection pattern c1 in that the value is not shared with the stylus 2 in advance. Furthermore, the control information c2 is different from the detection pattern c1 including the values "P" and "M" in that the control information c2 is represented by a value "D" that represents a power-of-two number of values with the above-described predetermined bit length (e.g., eight (=$2^3$) values).

The code string holding circuit 64 has a function of generating and holding a spreading code PN with an 11-chip length having auto-correlation property based on a control signal ctrl_t3 supplied from the logic unit 70. The spreading code PN held by the code string holding circuit 64 is supplied to the spreading processor 63.

The spreading processor 63 has a function of obtaining a transmission chip string with a 12-chip length by modulating the spreading code PN held by the code string holding circuit 64 based on the value of the symbol supplied through the switch 62 (information expressed by a transmission signal by processing of the spreading processor 63). This function will be described below by taking a concrete example.

Suppose that, in the example described below, each of the detection pattern c1, the delimiter pattern STP, and the control information c2 is formed of a combination of the bit string corresponding values 0 to 15 (corresponding bit strings "0000" to "1111") and the bit string non-corresponding values "P" and "M." Furthermore, suppose that the spreading code PN held by the code string holding circuit 64 is "00010010111." In this case, the spreading processor 63 converts the values of the respective symbols (0 to 15 and P and M) to transmission chip strings in accordance with Table 1 depicted below.

TABLE 1

| Value of symbol | Corresponding bit string | Polarity | Shift amount | Transmission chip string |
|---|---|---|---|---|
| P | Non-corresponding | Non-inversion | 0 (Basis) | 100010010111 |
| 0 | 0000 | Non-inversion | +2 | 111000100101 |
| 1 | 0001 | Non-inversion | +3 | 111100010010 |
| 3 | 0011 | Non-inversion | +4 | 101110001001 |
| 2 | 0010 | Non-inversion | +5 | 110111000100 |
| 6 | 0110 | Non-inversion | +6 | 101011100010 |
| 7 | 0111 | Non-inversion | +7 | 100101110001 |

TABLE 1-continued

| Value of symbol | Corresponding bit string | Polarity | Shift amount | Transmission chip string |
|---|---|---|---|---|
| 5 | 0101 | Non-inversion | +8 | 110010111000 |
| 4 | 0100 | Non-inversion | +9 (−2) | 101001011100 |
| M | Non-corresponding | Inversion | 0 (Basis) | 011101101000 |
| 8 | 1000 | Inversion | +2 | 000111011010 |
| 9 | 1001 | Inversion | +3 | 000011101101 |
| 11 | 1011 | Inversion | +4 | 010001110110 |
| 10 | 1010 | Inversion | +5 | 001000111011 |
| 14 | 1110 | Inversion | +6 | 010100011101 |
| 15 | 1111 | Inversion | +7 | 011010001110 |
| 13 | 1101 | Inversion | +8 | 001101000111 |
| 12 | 1100 | Inversion | +9 (−2) | 010110100011 |

As depicted in Table 1, in this example, first the value "P" of the symbol is converted to a transmission chip string obtained by giving "1" to the beginning of the spreading code PN "00010010111." Furthermore, each of the values "0" to "7" of the symbols is converted to a transmission chip string obtained by giving "1" to the beginning of a code string obtained through cyclic shift of the spreading code PN "00010010111" by the shift amount depicted in Table 1. The values "M" and "8" to "15" of the other symbols are each converted to a transmission chip string obtained by inverting the transmission chip string corresponding to a respective one of the values "P" and "0" to "7" of the symbols.

The spreading processor 63 is configured to obtain the transmission chip string by the above conversion processing and supply the transmission chip string to the transmission guard circuit 65.

The transmission guard circuit 65 has a function of inserting a guard period based on a control signal ctrl_t4 supplied from the logic unit 70. The guard period is a period during which both transmission and reception are suspended for switching between transmission operation and reception operation between a transmission period of the uplink signal US and a reception period in which a signal from the stylus 2 is received.

The selecting circuit 40 is a switch that carries out switching between a transmission period in which a signal is transmitted from the sensor 30 and a reception period in which a signal is received by the sensor 30 based on control by the logic unit 70. Specifically, the selecting circuit 40 includes switches 44x and 44y and conductor selecting circuits 41x and 41y. The switch 44x operates to connect the output terminal of the transmitter 60 to the input terminal of the conductor selecting circuit 41x in the transmission period and connect the output terminal of the conductor selecting circuit 41x to the input terminal of the receiver 50 in the reception period based on a control signal sTRx supplied from the logic unit 70. The switch 44y operates to connect the output terminal of the transmitter 60 to the input terminal of the conductor selecting circuit 41y in the transmission period and connect the output terminal of the conductor selecting circuit 41y to the input terminal of the receiver 50 in the reception period based on a control signal sTRy supplied from the logic unit 70. The conductor selecting circuit 41x operates to select one or plural electrodes in the plural linear electrodes 30X and connect the selected electrodes to the switch 44x based on a control signal selX supplied from the logic unit 70. The conductor selecting circuit 41y operates to select one or plural electrodes in the plural linear electrodes 30Y and connect the selected electrodes to the switch 44y based on a control signal selY supplied from the logic unit 70. It is, for example, when the uplink signal US is transmitted from the whole surface of the touch surface 3t that the plural linear electrodes 30X or the plural linear electrodes 30Y are selected by the conductor selecting circuit 41x or 41y.

The receiver 50 is a circuit for receiving the downlink signal DS pursuant to system A or system B in accordance with a control signal ctrl_r of the logic unit 70. Specifically, the receiver 50 includes an amplification circuit 51, a detection circuit 52, and an analog-digital (AD) converter 53. The concrete configuration of the receiver 50 described here is also exemplification and is different in some cases depending on the system. Furthermore, if systems A and B need the receivers 50 with configurations different from each other, the respective configurations may be disposed together in one receiver 50 and be selectively operated. Which of systems A and B is used by the receiver 50 is decided according to the operation mode of the sensor controller 31. This point will be described later.

The amplification circuit 51 amplifies and outputs the downlink signal DS supplied from the selecting circuit 40. The detection circuit 52 is a circuit that generates a voltage corresponding to the level of the output signal of the amplification circuit 51. The AD converter 53 is a circuit that generates a digital signal by sampling the voltage output from the detection circuit 52 at a predetermined time interval. The digital signal output by the AD converter 53 is supplied to the MCU 80.

The logic unit 70 and the MCU 80 are controllers that control transmission and reception operation of the transmitter 60, the receiver 50, and so forth. Specifically, the MCU 80 is a microprocessor that has read-only memory (ROM) and random access memory (RAM) inside and operates based on a predetermined program. Meanwhile, the logic unit 70 is configured to output the above-described respective control signals based on control by the MCU 80. Furthermore, the MCU 80 is configured to execute processing of deriving coordinate data x and y and so forth indicating the position of the stylus 2 based on the digital signal supplied from the AD converter 53 and outputting the coordinate data x and y and so forth to the system controller 32. The MCU 80 is configured to execute processing of, if the digital signal supplied from the AD converter 53 represents some kind of data, acquiring the data and outputting the data to the system controller 32.

Figure 3:
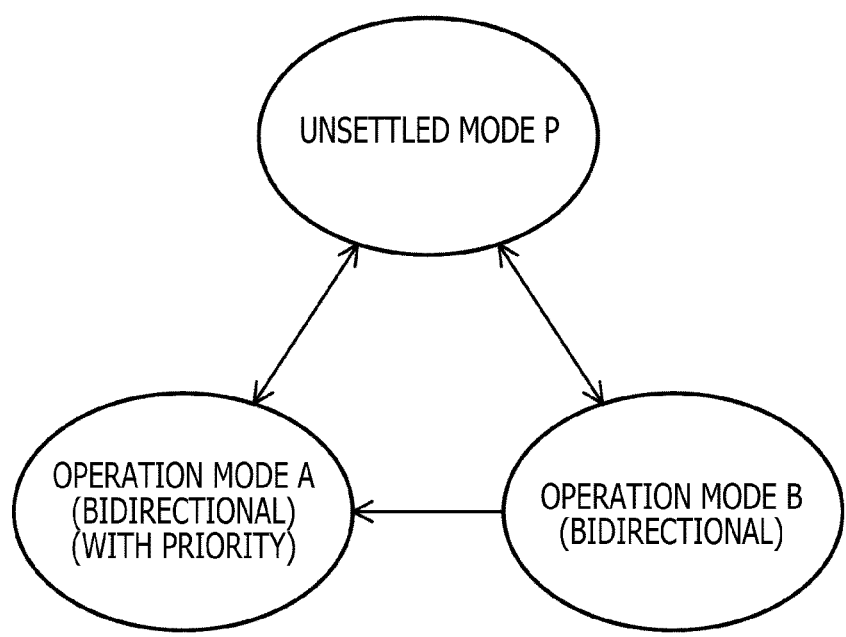
FIG. 3 is a mode transition diagram of a stylus and the sensor controller according to a first embodiment of the present disclosure.

FIG. 3 is a mode transition diagram of the stylus 2 and the sensor controller 31 in the present embodiment. As depicted in this diagram, the stylus 2 and the sensor controller 31 according to the present embodiment are configured to operate in any of unsettled mode P, operation mode A (first operation mode) in which communication pursuant to system A is carried out, and operation mode B (second operation mode) in which communication pursuant to system B is carried out. Among them, unsettled mode P means the state in which a device as a communication counterpart has not yet been detected. In unsettled mode P, which of operation modes A and B operation should be carried out has not been decided and transmission and reception of signals pursuant to systems A and B are alternately repeated as described later. Unsettled mode P can be referred to as a dual mode in which operation is alternately carried out in plural operation modes of systems A and B and so forth, and can also be referred to as a discovery mode as a mode in which any sensor controller 31 or stylus 2 is being detected. The stylus 2 may execute processing of switching indication of the indicator 26 in response to the transition of these operation modes. This point will be described in the third embodiment to be described later.

Here, with reference to FIG. 4 and FIG. 5, a description will be made about a problem caused when the stylus 2 and the sensor controller 31 compatible with systems A and B carry out operation according to the background art of the present disclosure. The operation of the stylus 2 and the sensor controller 31 to be described with reference to FIG. 4 and FIG. 5 is carried out also in operation according to the present embodiment, except for a point to be particularly described later.

Figure 4:
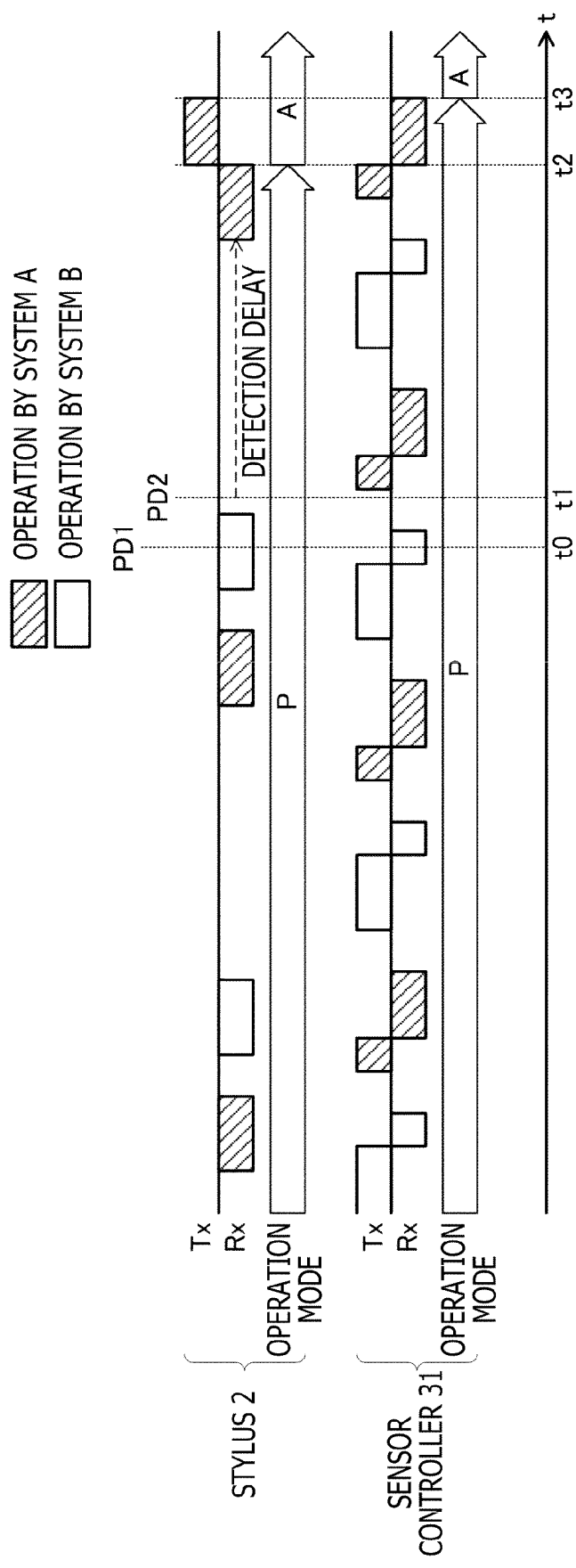
FIG. 4 is a diagram depicting signals transmitted and received between the stylus and the sensor controller according to the first embodiment of the present disclosure when the stylus and the sensor controller carry out operation according to a background art of the present disclosure.
Figure 5:
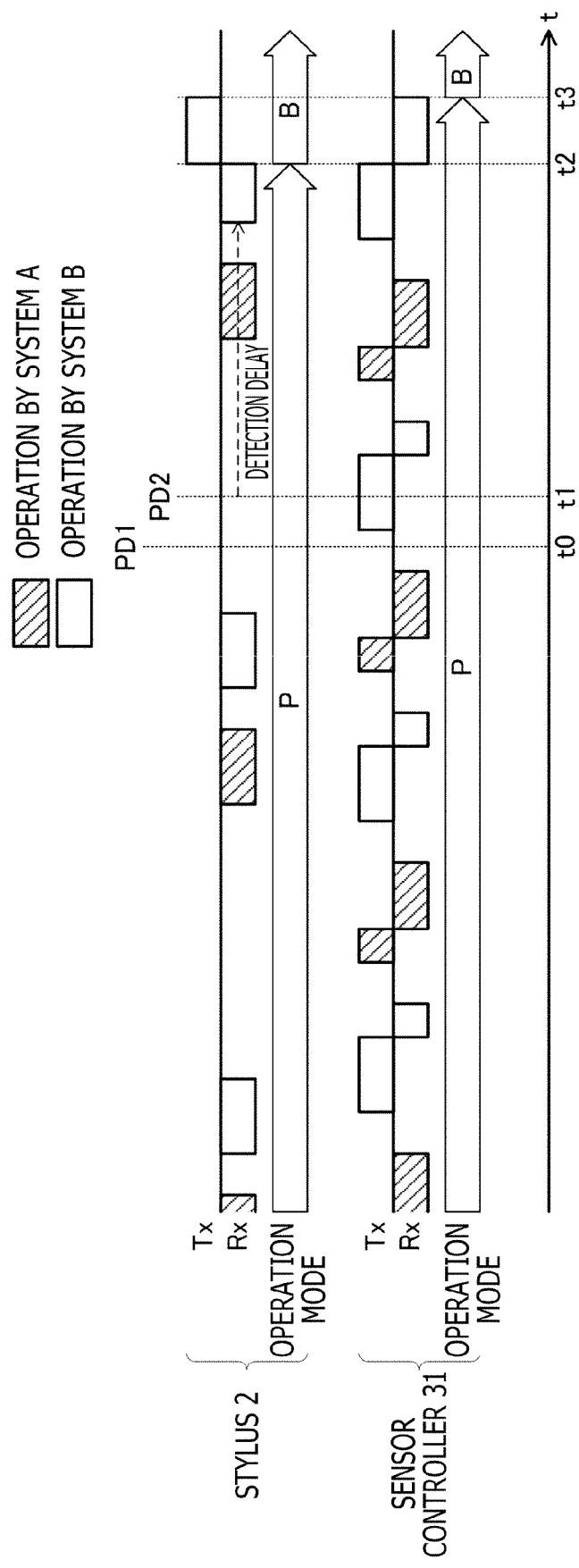
FIG. 5 is a diagram depicting signals transmitted and received between the stylus and the sensor controller according to the first embodiment of the present disclosure when the stylus and the sensor controller carry out operation according to the background art of the present disclosure.

FIG. 4 is a diagram depicting signals transmitted and received between the stylus 2 and the sensor controller 31 when the stylus 2 and the sensor controller 31 carry out the operation according to the background art of the present disclosure. In the example of this diagram, the first pen-down PD1 occurs at a clock time t0 and the second pen-down PD2 occurs at a clock time t1. The operation mode of each of the stylus 2 and the sensor controller 31 at the timing before the occurrence of the first pen-down PD1 is unsettled mode P, as depicted in FIG. 4.

In unsettled mode P, the stylus 2 alternately repeats reception operation of the uplink signal US pursuant to system A and reception operation of the uplink signal US pursuant to system B, and the sensor controller 31 sequentially repeats transmission operation of the uplink signal US pursuant to system A, reception operation of the downlink signal DS pursuant to system A, transmission operation of the uplink signal US pursuant to system B, and reception operation of the downlink signal DS pursuant to system B. Here, the reception operation and the transmission operation of the respective signals are carried out continuously for a predetermined time defined for each in advance. This point is the same also regarding reception operation and transmission operation of the respective signals to be described later. Furthermore, regarding each system, the cycle of the transmission operation of the uplink signal US by the sensor controller 31 and the cycle of the reception operation of the uplink signal US by the stylus 2 are configured in such a manner that either one cycle is not a multiple of the other. The purpose thereof is to avoid the occurrence of a situation in which the stylus 2 cannot receive the uplink signal US transmitted by the sensor controller 31 indefinitely, despite that the uplink signal US reaches the stylus 2. Furthermore, it is preferable that the continuation time of the reception operation by each system (above-described predetermined time) be set to at least a time equal to or longer than the transmission cycle of the corresponding uplink signal US (cycle of transmission by the sensor controller 31), as with the continuation time of reception operation of the uplink signal US carried out by the stylus 2 from the clock time t1 in FIG. 6 to be described later. Moreover, it is preferable for the reception operation of the stylus 2 to be repeatedly carried out with the intermediary of a break period, during which reception operation is not carried out to avoid wasting the power supply 25 (FIG. 1), also as depicted in FIG. 4.

The most preferable mode transition of the stylus 2 and the sensor controller 31 in response to the occurrence of the first pen-down PD1 and the second pen-down PD2 is that the stylus 2 and the sensor controller 31 both enter operation mode A between the clock time t0 and the clock time t1 (that is, before the occurrence of the second pen-down PD2). This is implemented through execution, between the clock time t0 and the clock time t1, of a series of processing in which the stylus 2 receives the uplink signal US pursuant to system A and the sensor controller 31 receives the downlink signal DS transmitted by the stylus 2 that has started operation in operation mode A due to the reception of the uplink signal US and, thereby, the sensor controller 31 also starts operation in operation mode A.

However, in the case in which a user quickly operates the stylus 2 and the interval between the clock time t0 and the clock time t1 is short, or the like, the situation may arise in which the stylus 2 cannot receive the uplink signal US for a while even after passing through the clock time t1, as exemplified in FIG. 4. In the example of FIG. 4, the stylus 2 receives the uplink signal US transmitted pursuant to system A finally at a clock time t2 after the clock time t1, and the stylus 2 enters operation mode A as a result. Then, at a subsequent clock time t3, the sensor controller 31 that has received the downlink signal DS transmitted pursuant to system A enters operation mode A, and communication between the stylus 2 and the sensor controller 31 pursuant to system A is started. That is, delay corresponding to the time t3-t1 occurs from the occurrence of the second pen-down PD2 at the clock time t1 to the start of the communication between the stylus 2 and the sensor controller 31 pursuant to system A at the clock time t3. The occurrence of this delay is one of problems in the background art of the present embodiment.

FIG. 5 is also a diagram depicting signals transmitted and received between the stylus 2 and the sensor controller 31 when the stylus 2 and the sensor controller 31 carry out the operation according to the background art of the present disclosure. The example of this diagram is different from the example depicted in FIG. 4 in terms of the timing of reception operation of the stylus 2 (relative timing with respect to transmission operation of the sensor controller 31).

As a result of the above-described difference, the stylus 2 receives the uplink signal US transmitted pursuant to system B and enters operation mode B at the clock time t2 in the example of FIG. 5. In response to this, the sensor controller 31 also enters operation mode B at the clock time t3, so that communication between the stylus 2 and the sensor controller 31 pursuant to system B is started. Because the order of priority of system B is low compared with system A, it is not preferable that the communication pursuant to system B be started as above between the stylus 2 and the sensor controller 31 compatible with both systems A and B, and it is desired to quickly carry out switching to communication pursuant to system A. This is another of the problems in the background art of the present embodiment.

Figure 6:
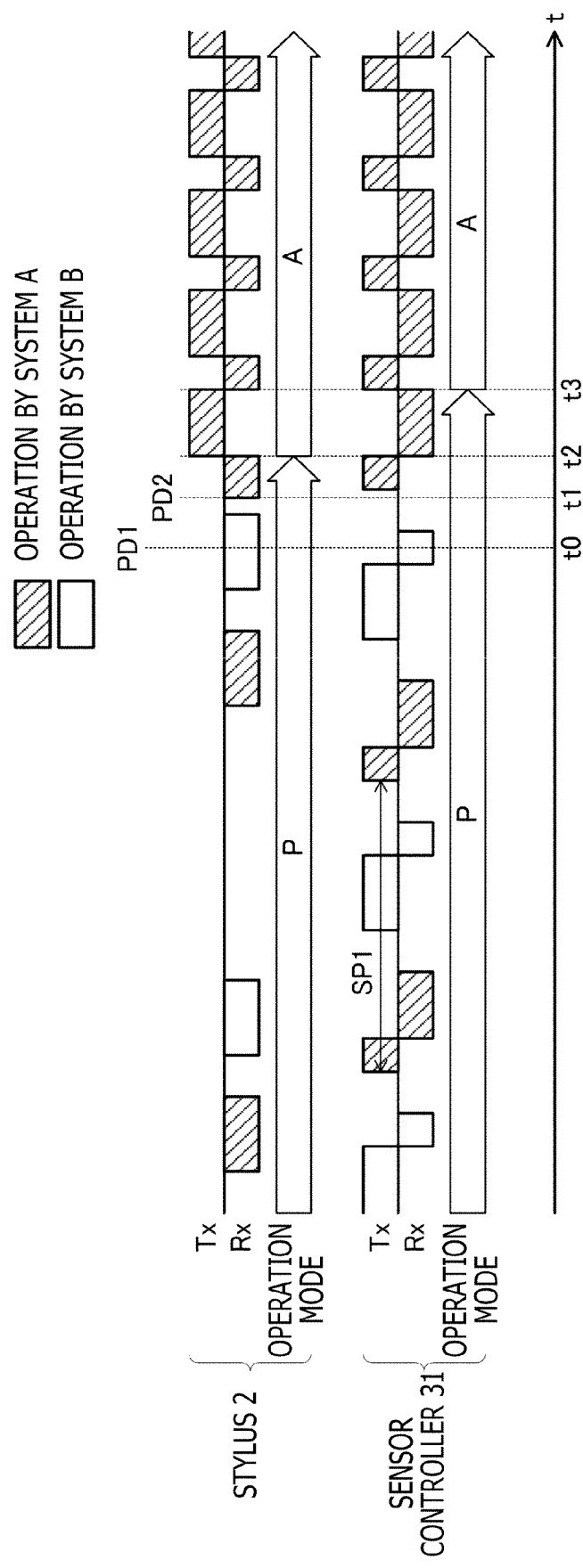
FIG. 6 is a diagram depicting signals transmitted and received between the stylus and the sensor controller according to the first embodiment of the present disclosure when the stylus and the sensor controller carry out operation according to the present embodiment.

FIG. 6 is a diagram depicting signals transmitted and received between the stylus 2 and the sensor controller 31 when the stylus 2 and the sensor controller 31 carry out operation according to the present embodiment. In this diagram, particularly operation of the stylus 2 for avoiding the above-described delay is depicted.

As depicted in FIG. 6, after detecting the second pen-down PD2 at the clock time t1, the stylus 2 immediately starts reception operation of the uplink signal US pursuant to system A if its own operation mode is still unsettled mode P. This reception operation is continued for at least a time equal to or longer than the transmission cycle of the sensor controller 31 (cycle SP1 depicted in the diagram) until the uplink signal US pursuant to system A is received. Due to this, if the sensor controller 31 transmits the uplink signal US pursuant to system A, the stylus 2 can surely receive the uplink signal US pursuant to system A unless the stylus 2 leaves the sensing range SR (FIG. 1). In addition, because the reception operation of the uplink signal US pursuant to system A is started immediately after the occurrence of the second pen-down PD2, the delay from the second pen-down PD2 to the start of communication pursuant to system A can also be minimized.

Figure 7:
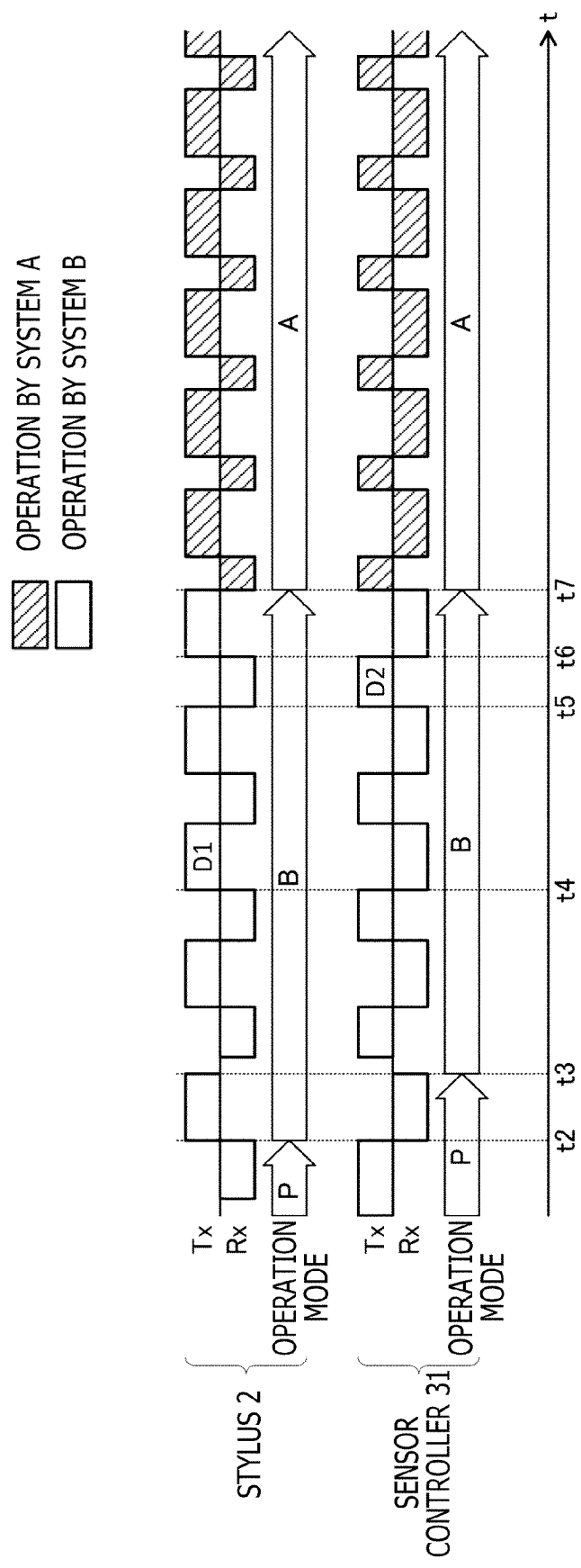
FIG. 7 is a diagram depicting signals transmitted and received between the stylus and the sensor controller according to the first embodiment of the present disclosure when the stylus and the sensor controller carry out operation according to the present embodiment.

FIG. 7 is also a diagram depicting signals transmitted and received between the stylus 2 and the sensor controller 31 according to the present embodiment. Particularly this diagram depicts operation of the stylus 2 and the sensor controller 31 for switching to communication pursuant to system A with the higher order of priority after communication pursuant to system B with the lower order of priority is started. Even when the stylus 2 and the sensor controller 31 carry out the operation according to the present embodiment, such a situation possibly occurs, for example, if the stylus 2 receives the uplink signal US pursuant to system B between the clock time t0 and the clock time t1.

As depicted in FIG. 7, the stylus 2 that has started operation in operation mode B transmits the downlink signal DS (D1, first signal) including the unique ID at an arbitrary clock time t4. As this arbitrary clock time t4, a clock time according to the uplink signal US from the sensor controller 31 or a command included therein may be employed, or a clock time according to the clock time t2, when the stylus 2 has started the operation in operation mode B, may be employed. When receiving the downlink signal DS (D1), the sensor controller 31 acquires the unique ID included therein by demodulation and decoding. Then, the sensor controller 31 determines whether or not the stylus 2 is compatible with also system A based on the acquired unique ID. If determining that the stylus 2 is compatible, the sensor controller 31 transmits the uplink signal US (D2, second signal) including a command that represents an instruction for switching to operation mode A at a clock time t5. When receiving the uplink signal US (D2) at a clock time t6, the stylus 2 acquires the switching instruction included therein by demodulation and decoding. Then, in response to the acquired switching instruction, the sensor controller 31 switches its own operation mode to operation mode A at a clock time t7.

The required time from the transmission of the uplink signal US (D2) by the sensor controller 31 to the transition of the stylus 2 to operation mode A can be decided in advance as part of the specifications of the stylus 2. Therefore, the sensor controller 31 may know, in advance, the clock time t7, at which the stylus 2 that has received the switching instruction makes the transition to operation mode A and, thus, may execute processing of switching its own operation mode to operation mode A at the clock time t7. Thereby, communication pursuant to system A with the higher order of priority is started between the stylus 2 and the sensor controller 31.

Figure 8:
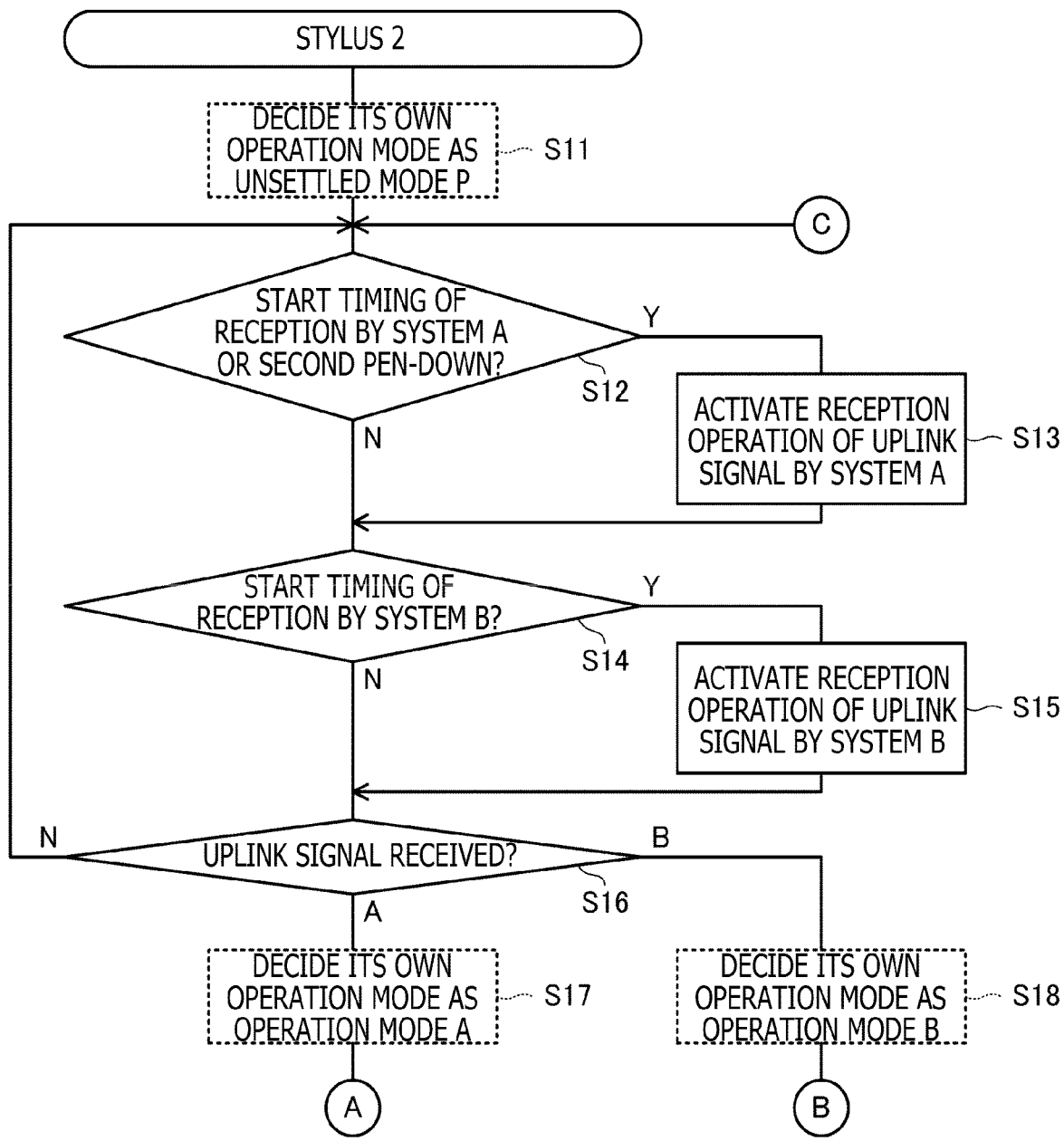
FIG. 8 is a processing flowchart depicting operation of the stylus according to the first embodiment of the present disclosure.
Figure 9:
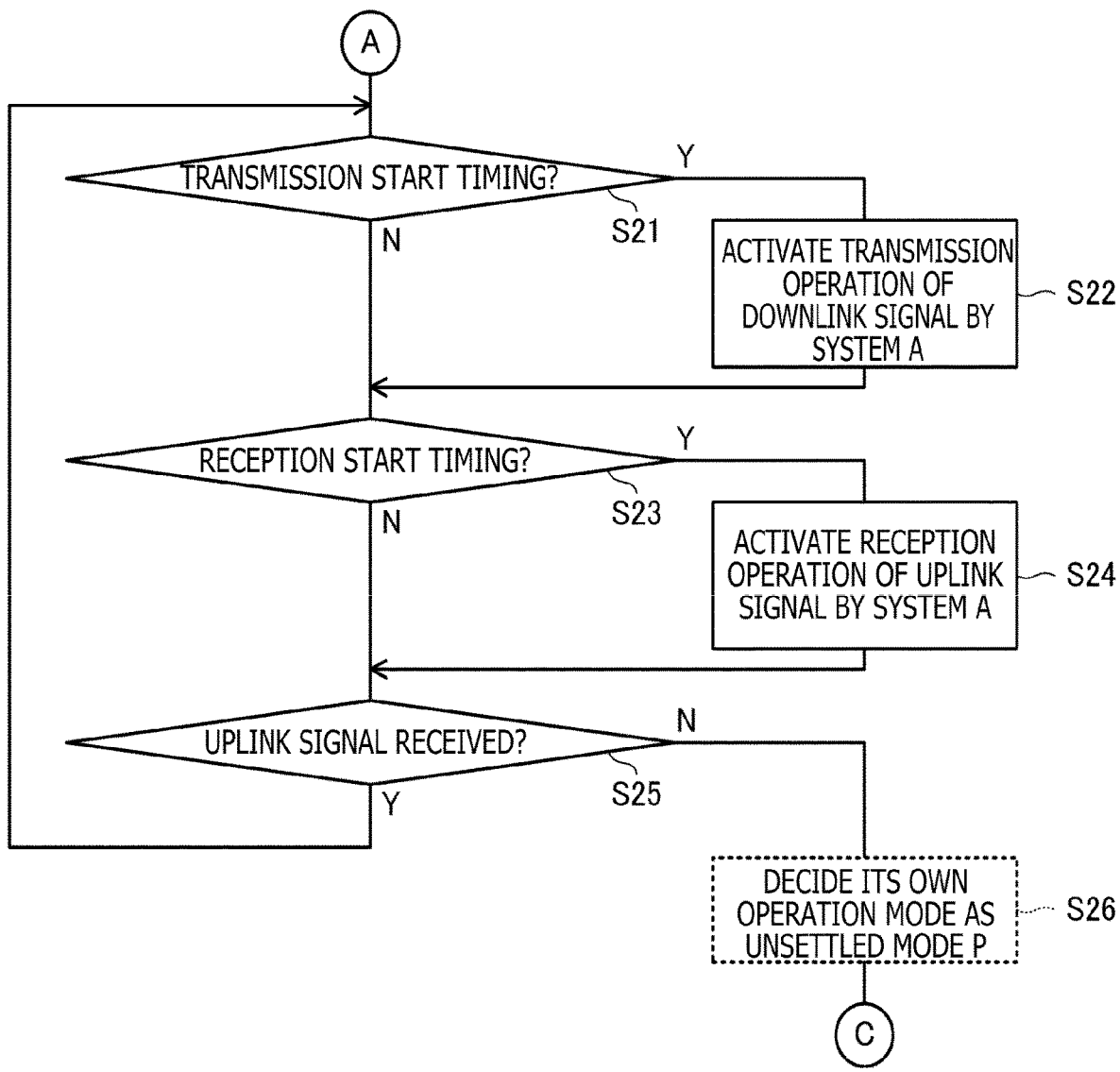
FIG. 9 is a processing flowchart depicting the operation of the stylus according to the first embodiment of the present disclosure.
Figure 10:
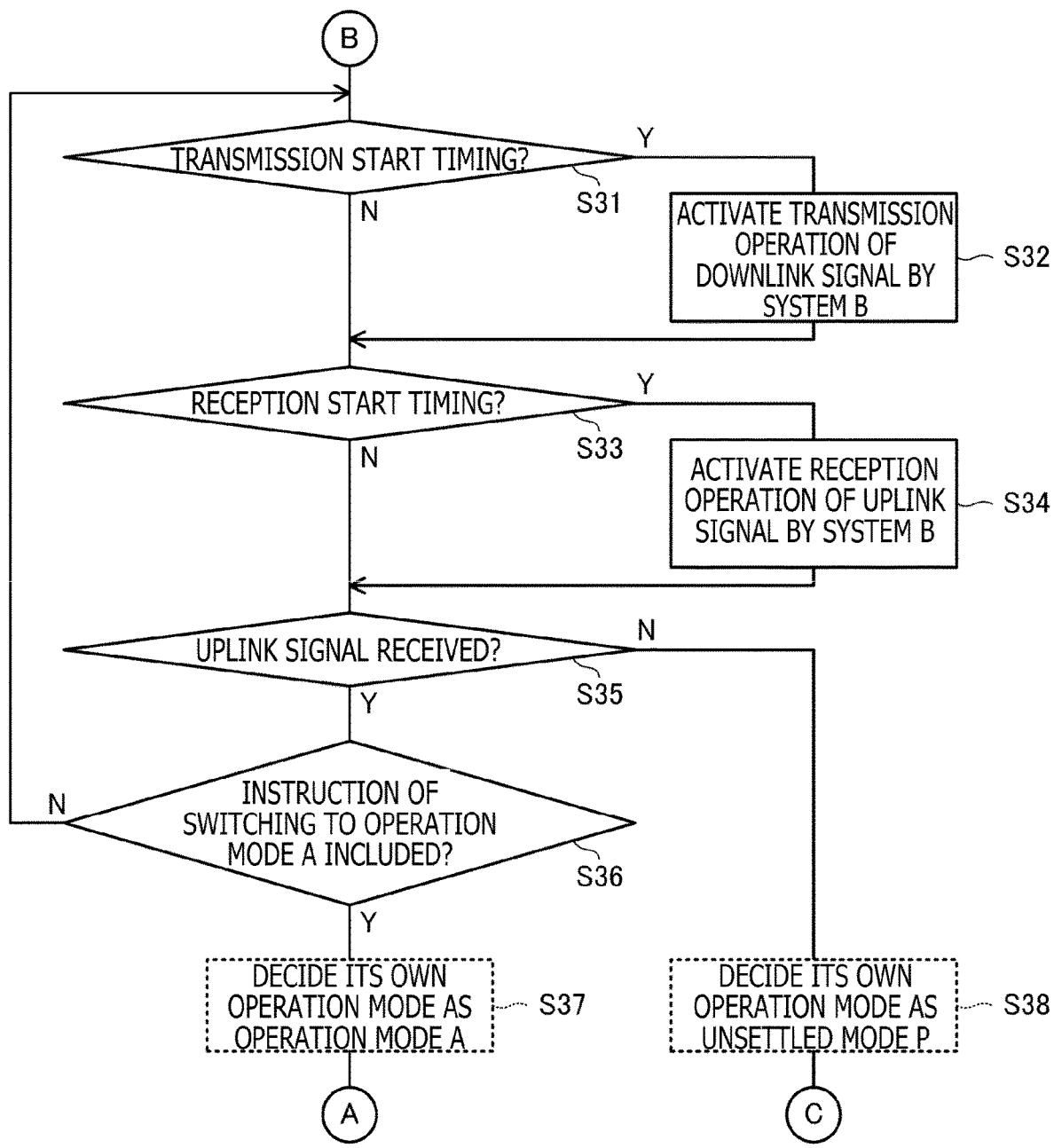
FIG. 10 is a processing flowchart depicting the operation of the stylus according to the first embodiment of the present disclosure.

FIG. 8 to FIG. 10 are processing flowcharts depicting the operation of the stylus 2 according to the present embodiment. With reference to these diagrams, the operation of the stylus 2 according to the present embodiment will be described in more detail below.

As depicted in FIG. 8, first the stylus 2 sets its own operation mode to unsettled mode P (step S11). Then, the stylus 2 detects each of the arrival of the start timing of reception pursuant to system A, the arrival of the start timing of reception pursuant to system B, and the occurrence of the second pen-down (steps S12 and S14). If the start timing of reception pursuant to system A has arrived or if the second pen-down has occurred, the stylus 2 activates reception operation of the uplink signal US pursuant to system A (step S13). This reception operation when the second pen-down has occurred is continued for at least a time equal to or longer than the transmission cycle of the sensor controller 31

(cycle SP1 depicted in FIG. 6) until the uplink signal US pursuant to system A is received as described above. Furthermore, if the start timing of reception pursuant to system B has arrived, the stylus 2 activates reception operation of the uplink signal US pursuant to system B (step S15).

Moreover, the stylus 2 determines whether or not the uplink signal US has been received by the reception operation started in the step S13 or the step S15 (step S16). If determining that the uplink signal US has been received by the reception operation started in the step S13 (that is, if the uplink signal US pursuant to system A has been received), the stylus 2 switches its own operation mode to operation mode A (step S17). If determining that the uplink signal US has been received by the reception operation started in the step S15 (that is, if the uplink signal US pursuant to system B has been received), the stylus 2 switches its own operation mode to operation mode B (step S18).

FIG. 9 depicts operation of the stylus 2 after operation in operation mode A is started. As depicted in this diagram, the stylus 2 detects each of the arrival of the transmission start timing and the arrival of the reception start timing (steps S21 and S23). Then, the stylus 2 activates transmission operation of the downlink signal DS pursuant to system A (step S22) if the transmission start timing has arrived, and activates reception operation of the uplink signal US pursuant to system A (step S24) if the reception start timing has arrived.

Furthermore, the stylus 2 determines whether or not the uplink signal US has been received by the reception operation started in the step S24 (step S25). If determining that the uplink signal US has been received, the stylus 2 returns to the step S21 and repeats the processing. On the other hand, if determining that the uplink signal US has not been received, the stylus 2 returns its own operation mode to unsettled mode P (step S26) and returns the processing to the step S12 in FIG. 8. This processing is executed in order to return the stylus 2 to unsettled mode P when the stylus 2 is separated from the touch surface 3t.

FIG. 10 depicts operation of the stylus 2 after operation in operation mode B is started. As depicted in this diagram, the stylus 2 detects each of the arrival of the transmission start timing and the arrival of the reception start timing (steps S31 and S33). Then, the stylus 2 activates transmission operation of the downlink signal DS pursuant to system B (step S32) if the transmission start timing has arrived, and activates reception operation of the uplink signal US pursuant to system B (step S34) if the reception start timing has arrived.

Furthermore, the stylus 2 determines whether or not the uplink signal US has been received by the reception operation started in the step S34 (step S35). If determining that the uplink signal US has been received, the stylus 2 determines whether or not an instruction for switching to operation mode A is included therein (step S36). If determining that the switching instruction is included as a result, the stylus 2 switches its own operation mode to operation mode A (step S37) and moves the processing to the step S21 in FIG. 9. On the other hand, if determining that the switching instruction is not included, the stylus 2 returns to the step S31 and repeats the processing.

If determining that the uplink signal US has not been received in the step S35, the stylus 2 returns its own operation mode to unsettled mode P (step S38) and returns the processing to the step S12 in FIG. 8. This processing is executed in order to return the stylus 2 to unsettled mode P when the stylus 2 is separated from the touch surface 3t, similarly to the step S26 in FIG. 9.

Figure 11:
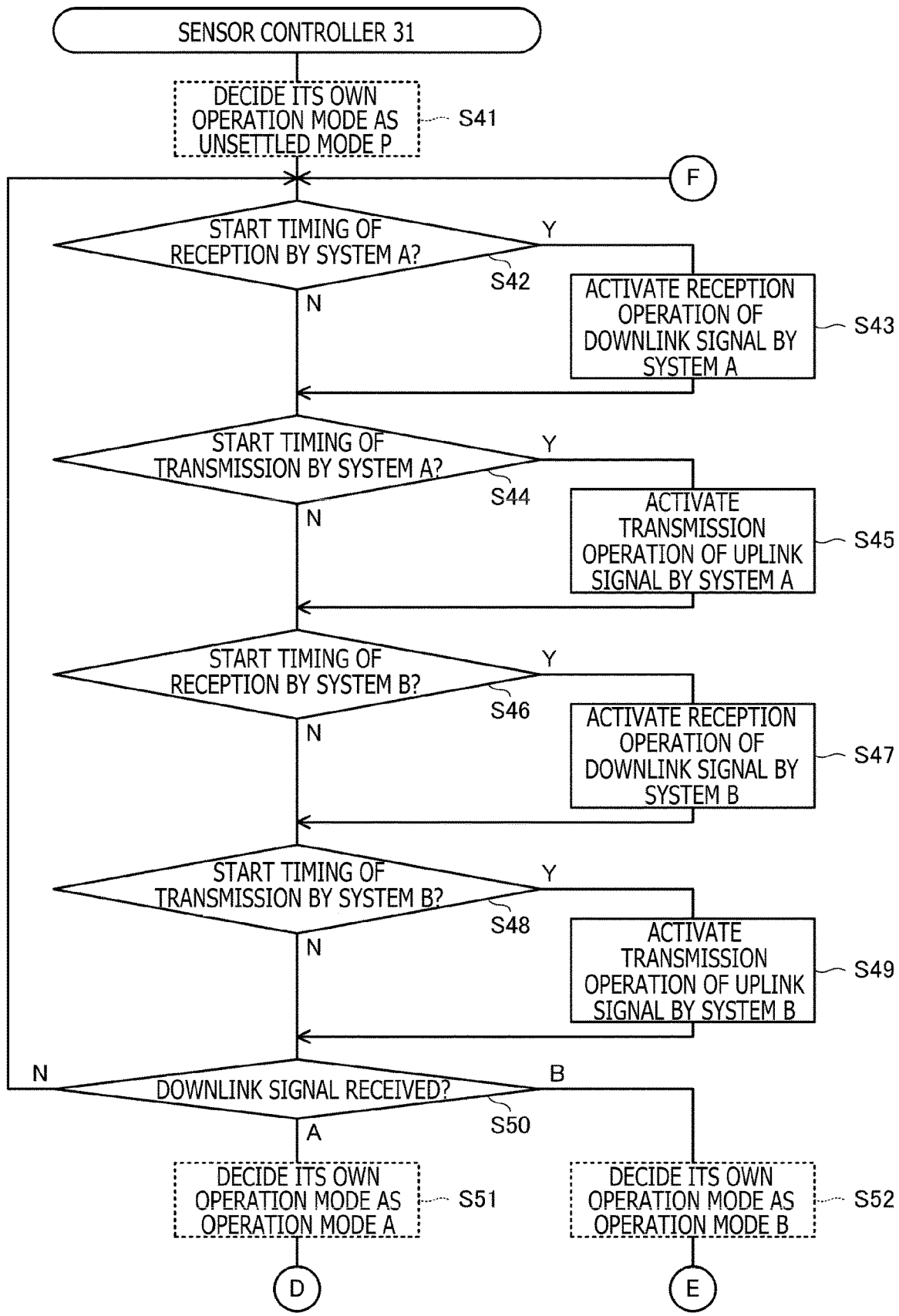
FIG. 11 is a processing flowchart depicting operation of the sensor controller according to the first embodiment of the present disclosure.
Figure 12:
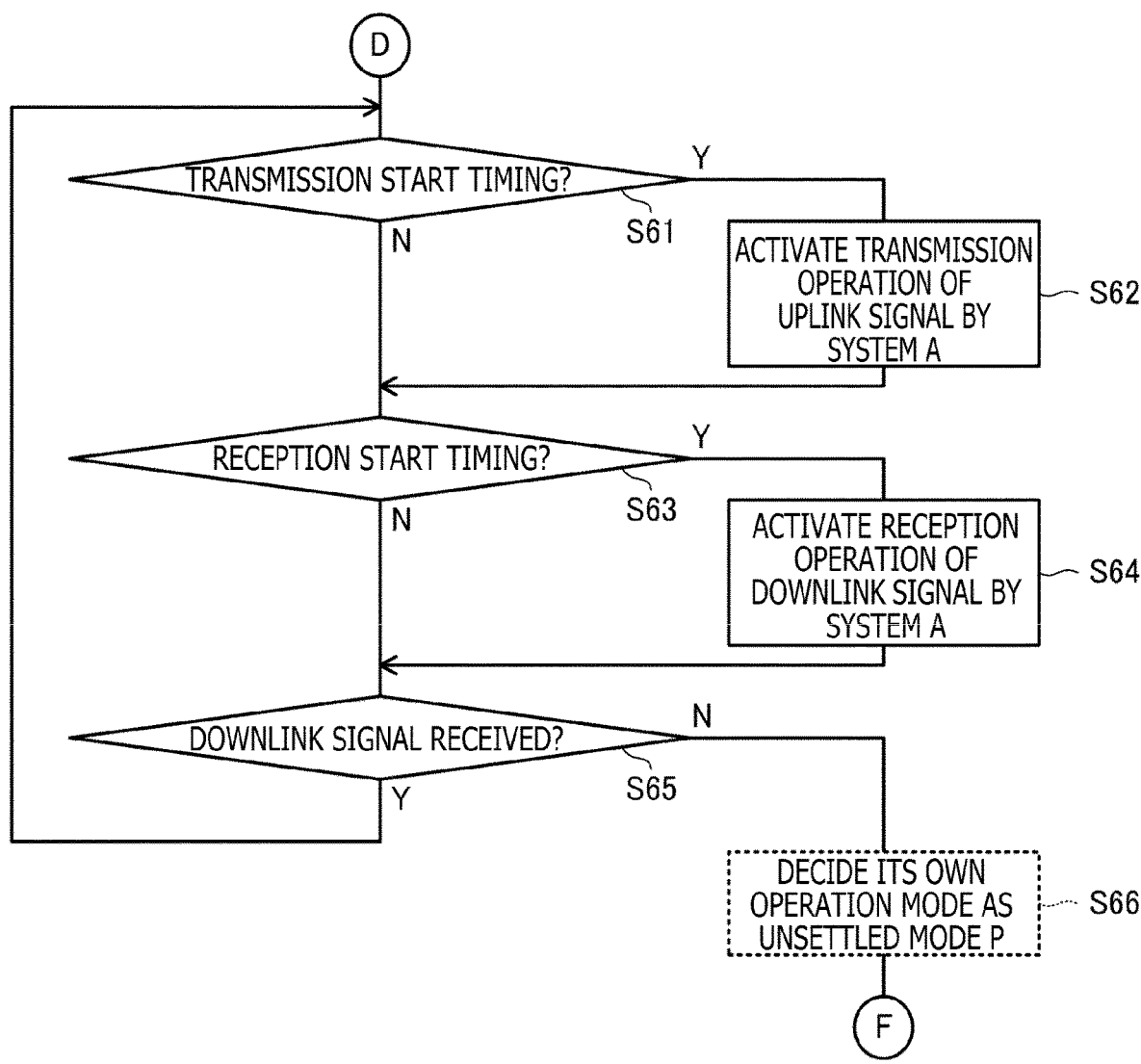
FIG. 12 is a processing flowchart depicting the operation of the sensor controller according to the first embodiment of the present disclosure.
Figure 13:
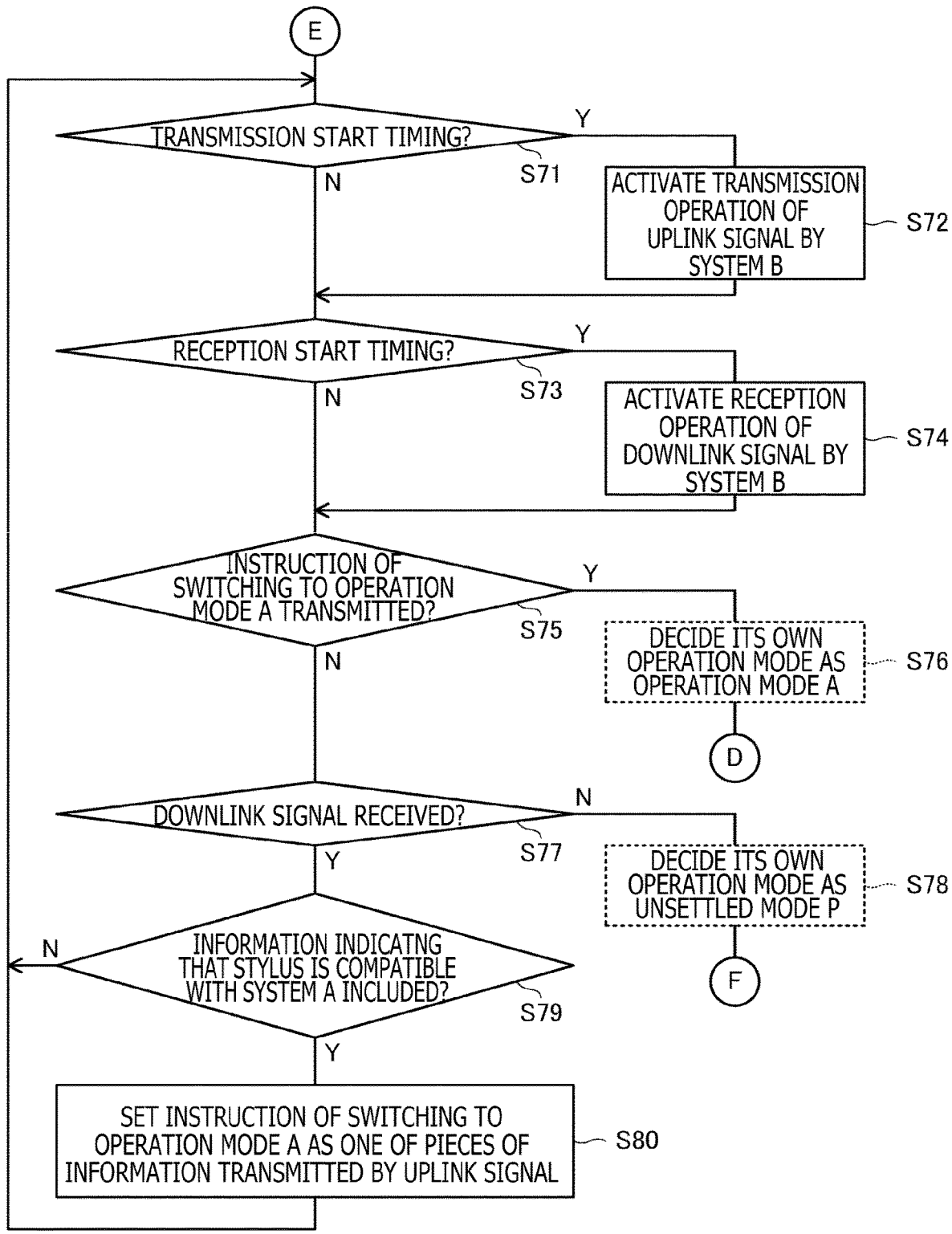
FIG. 13 is a processing flowchart depicting the operation of the sensor controller according to the first embodiment of the present disclosure.

FIG. 11 to FIG. 13 are processing flowcharts depicting processing executed by the sensor controller 31 according to the present embodiment. With reference to these diagrams, the operation of the sensor controller 31 according to the present embodiment will be described in more detail below.

As depicted in FIG. 11, first the sensor controller 31 sets its own operation mode to unsettled mode P (step S41). Then, the sensor controller 31 detects each of the arrival of the start timing of reception pursuant to system A, the arrival of the start timing of transmission pursuant to system A, the arrival of the start timing of reception pursuant to system B, and the arrival of the start timing of transmission pursuant to system B (steps S42, S44, S46, and S48). If the start timing of reception pursuant to system A has arrived, the sensor controller 31 activates reception operation of the downlink signal DS pursuant to system A (step S43). Similarly, if the start timing of transmission pursuant to system A has arrived, the sensor controller 31 activates transmission operation of the uplink signal US pursuant to system A (step S45). If the start timing of reception pursuant to system B has arrived, the sensor controller 31 activates reception operation of the downlink signal DS pursuant to system B (step S47). If the start timing of transmission pursuant to system B has arrived, the sensor controller 31 activates transmission operation of the uplink signal US pursuant to system B (step S49).

Furthermore, the sensor controller 31 determines whether or not the downlink signal DS has been received by the reception operation started in the step S43 or the step S47 (step S50). Then, if determining that the downlink signal DS has been received by the reception operation started in the step S43 (that is, if the downlink signal DS pursuant to system A has been received), the sensor controller 31 switches its own operation mode to operation mode A (step S51). If determining that the downlink signal DS has been received by the reception operation started in the step S47 (that is, if the downlink signal DS pursuant to system B has been received), the sensor controller 31 switches its own operation mode to operation mode B (step S52).

FIG. 12 depicts operation of the sensor controller 31 after operation in operation mode A is started. As depicted in this diagram, the sensor controller 31 detects each of the arrival of the transmission start timing and the arrival of the reception start timing (steps S61 and S63). Then, the sensor controller 31 activates transmission operation of the uplink signal US pursuant to system A (step S62) if the transmission start timing has arrived, and activates reception operation of the downlink signal DS pursuant to system A (step S64) if the reception start timing has arrived.

Furthermore, the sensor controller 31 determines whether or not the downlink signal DS has been received by the reception operation started in the step S64 (step S65). If determining that the downlink signal DS has been received, the sensor controller 31 returns to the step S61 and repeats the processing. On the other hand, if determining that the downlink signal DS has not been received, the sensor controller 31 returns its own operation mode to unsettled mode P (step S66) and returns the processing to the step S42 in FIG. 11. This processing is executed in order to return the sensor controller 31 to unsettled mode P when the stylus 2 is separated from the touch surface 3t.

FIG. 13 depicts operation of the sensor controller 31 after operation in operation mode B is started. As depicted in this diagram, the sensor controller 31 detects each of the arrival of the transmission start timing and the arrival of the reception start timing (steps S71 and S73). Then, the sensor controller 31 activates transmission operation of the uplink signal US pursuant to system B (step S72) if the transmission start timing has arrived, and activates reception operation of the downlink signal DS pursuant to system B (step S74) if the reception start timing has arrived.

Furthermore, the sensor controller 31 determines whether or not an instruction for switching to operation mode A has been included in the uplink signal US and been transmitted (step S75). If determining that the switching instruction has been transmitted, the sensor controller 31 switches its own operation mode to operation mode A at the timing at which the stylus 2 makes a transition to operation mode A (step S76). Thereafter, the sensor controller 31 moves to the step S61 in FIG. 12 and continues the processing.

If determining that the switching instruction has not been transmitted in the step S75, next the sensor controller 31 determines whether or not the downlink signal DS has been received by the reception operation started in the step S74 (step S77). If determining that the downlink signal DS has not been received here, the sensor controller 31 returns its own operation mode to unsettled mode P (step S78) and returns the processing to the step S42 in FIG. 11. This processing is executed in order to return the sensor controller 31 to unsettled mode P when the stylus 2 is separated from the touch surface 3t, similarly to the step S66 in FIG. 12.

If determining that the downlink signal DS has been received in the step S77, the sensor controller 31 determines whether or not function information indicating that the stylus 2 is compatible with system A is included in the received downlink signal DS (step S79). Specifically, the function information is information that represents all or part of the unique ID of the stylus 2, as described above. If determining that the function information indicating that the stylus 2 is compatible with system A is included in the downlink signal DS, the sensor controller 31 sets a command including an instruction for switching to operation mode A as one of pieces of information transmitted by the uplink signal US (step S80). The command thus set is transmitted when the step S72 is next carried out. Then, in the subsequent step S75, it is determined that an instruction for switching to operation mode A has been included in the uplink signal US and been transmitted. As a result of such processing, both the stylus 2 and the sensor controller 31 make a transition to operation mode A.

As described above, according to the method carried out by the stylus 2 in accordance with the present embodiment, the stylus 2 can activate reception operation of a signal pursuant to system A immediately after contacting the touch surface 3t. Therefore, it becomes possible to shorten the time from the contact with the touch surface 3t to setting the stylus 2 to operation mode A.

Furthermore, according to the method carried out by the stylus 2 and the sensor controller 31 in accordance with the present embodiment, even when the operation mode of the stylus 2 is operation mode B, in which transmission and reception of a signal pursuant to system B are carried out, the operation mode of the stylus 2 can be switched to operation mode A by an instruction by the sensor controller 31 that has ascertained that the stylus 2 is compatible with system A. Therefore, it becomes possible to start communication pursuant to system A between the stylus 2 and the sensor controller 31.

Next, a second embodiment of the present disclosure will be described. The stylus 2 and the sensor controller 31 according to the present embodiment are different from the stylus 2 and the sensor controller 31 according to the first embodiment in that they are compatible, instead of system B, with system C compatible with unidirectional communication from the stylus 2 to the sensor controller 31. They are the same in the other points. Therefore, the description will be made with focus on the different point in the following. A higher order of priority is set for system A than system C.

Figure 14:
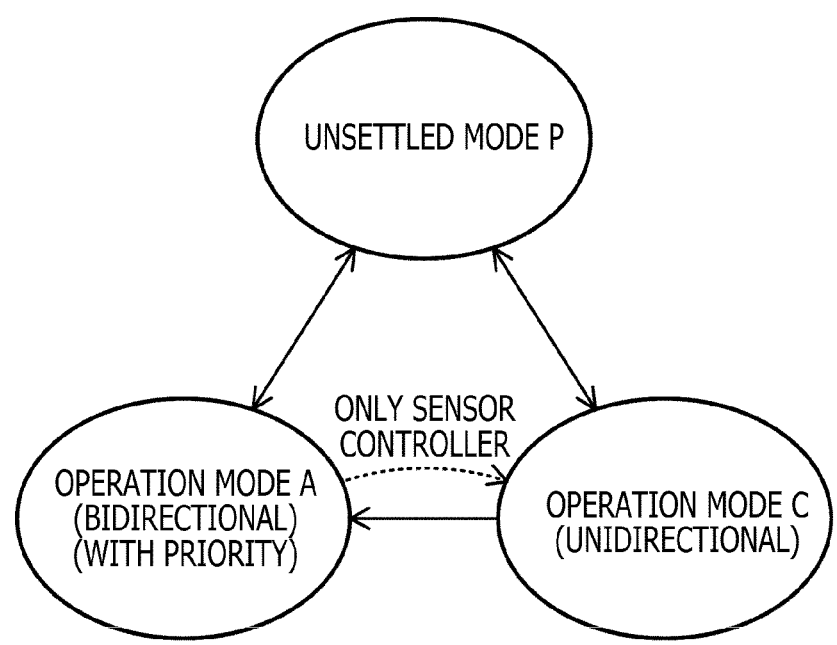
FIG. 14 is a mode transition diagram of the stylus and the sensor controller according to a second embodiment of the present disclosure.

FIG. 14 is a mode transition diagram of the stylus 2 and the sensor controller 31 in the present embodiment. As depicted in this diagram, the stylus 2 and the sensor controller 31 according to the present embodiment are configured to operate in any of unsettled mode P, operation mode A (first operation mode) in which communication pursuant to system A is carried out, and operation mode C (second operation mode) in which communication pursuant to system C is carried out.

Here, with reference to FIG. 15, a description will be made about a problem caused when the stylus 2 and the sensor controller 31 compatible with systems A and C carry out operation according to the background art of the present disclosure. The operation of the stylus 2 and the sensor controller 31 to be described with reference to FIG. 15 is carried out also in operation according to the present embodiment, except for a point to be particularly described later.

Figure 15:
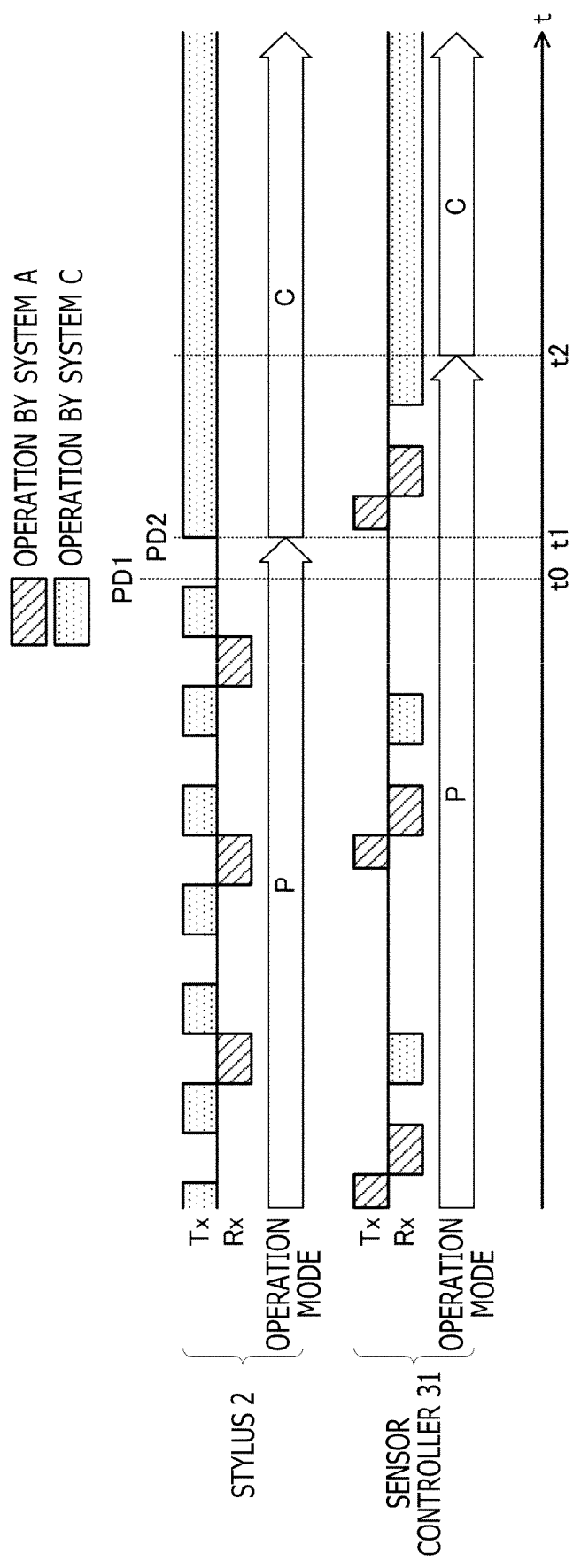
FIG. 15 is a diagram depicting signals transmitted and received between the stylus and the sensor controller according to the second embodiment of the present disclosure when the stylus and the sensor controller carry out operation according to the background art of the present disclosure.

FIG. 15 is a diagram depicting signals transmitted and received between the stylus 2 and the sensor controller 31 when the stylus 2 and the sensor controller 31 carry out the operation according to the background art of the present disclosure. Also in the example of this diagram, similarly to the example of FIG. 4 and so forth, the first pen-down PD1 occurs at the clock time t0 and the second pen-down PD2 occurs at the clock time t1. The operation mode of each of the stylus 2 and the sensor controller 31 at the timing before the occurrence of the first pen-down PD1 is unsettled mode P, as depicted in FIG. 15.

In unsettled mode P, the stylus 2 is configured to alternately repeat transmission operation of the downlink signal DS pursuant to system C and reception operation of the uplink signal US pursuant to system A. However, in the example of FIG. 15, the reception operation of the uplink signal US pursuant to system A is omitted once every two times for reduction in the power consumption. In the present disclosure, such operation is also included in the operation of "alternately repeating transmission operation of the downlink signal DS pursuant to system C and reception operation of the uplink signal US pursuant to system A." Furthermore, the sensor controller 31 is configured to sequentially repeat transmission operation of the uplink signal US pursuant to system A, reception operation of the downlink signal DS pursuant to system A, and reception operation of the downlink signal DS pursuant to system C. Here, the cycle at which the stylus 2 transmits the downlink signal DS pursuant to system C and the cycle at which the sensor controller 31 receives the downlink signal DS pursuant to system C are configured in such a manner that either one cycle is not a multiple of the other. This is the same also regarding the cycle at which the stylus 2 receives the uplink signal US pursuant to system A and the cycle at which the sensor controller 31 transmits the uplink signal US pursuant to system A. The purpose of this is to avoid the occurrence of a situation in which, although a signal transmitted by one device reaches the other device, the other device cannot receive the signal indefinitely.

Also in the example of FIG. 15, the most preferable mode transition of the stylus 2 and the sensor controller 31 in response to the occurrence of the first pen-down PD1 and the second pen-down PD2 is that the stylus 2 and the sensor controller 31 both enter operation mode A between the clock time t0 and the clock time t1 (that is, before the occurrence of the second pen-down PD2). This is implemented through execution, between the clock time t0 and the clock time t1, of a series of processing in which the stylus 2 receives the uplink signal US pursuant to system A and the sensor controller 31 receives the downlink signal DS transmitted by the stylus 2 that has started operation in operation mode A due to the reception of the uplink signal US and, thereby, the sensor controller 31 also starts operation in operation mode A, similarly to the case of FIG. 4.

However, in the case in which a user quickly operates the stylus 2 and the interval between the clock time t0 and the clock time t1 is short, or in the case in which the stylus 2 cannot detect the uplink signal US, the situation may arise in which the stylus 2 is still incapable of receiving the uplink signal US even when the clock time t1 is reached, as exemplified in FIG. 15. Thus, according to the operation according to the background art, if the clock time t1 is reached without a transition to operation mode A, the stylus 2 immediately switches its own operation mode to operation mode C. Due to this, the stylus 2 exclusively carries out transmission operation of the downlink signal DS pursuant to system C. Thus, the sensor controller 31 also makes a transition to operation mode C eventually and communication between the stylus 2 and the sensor controller 31 pursuant to system C is started (clock time t2). It is not preferable that the communication pursuant to system C be started in this manner between the stylus 2 and the sensor controller 31 compatible with both systems A and C. Therefore, it is desired to prevent the start of communication pursuant to system C, or to quickly carry out switching to communication pursuant to system A, even when the communication pursuant to system C is started. They are problems in the background art of the present embodiment.

Figure 16:
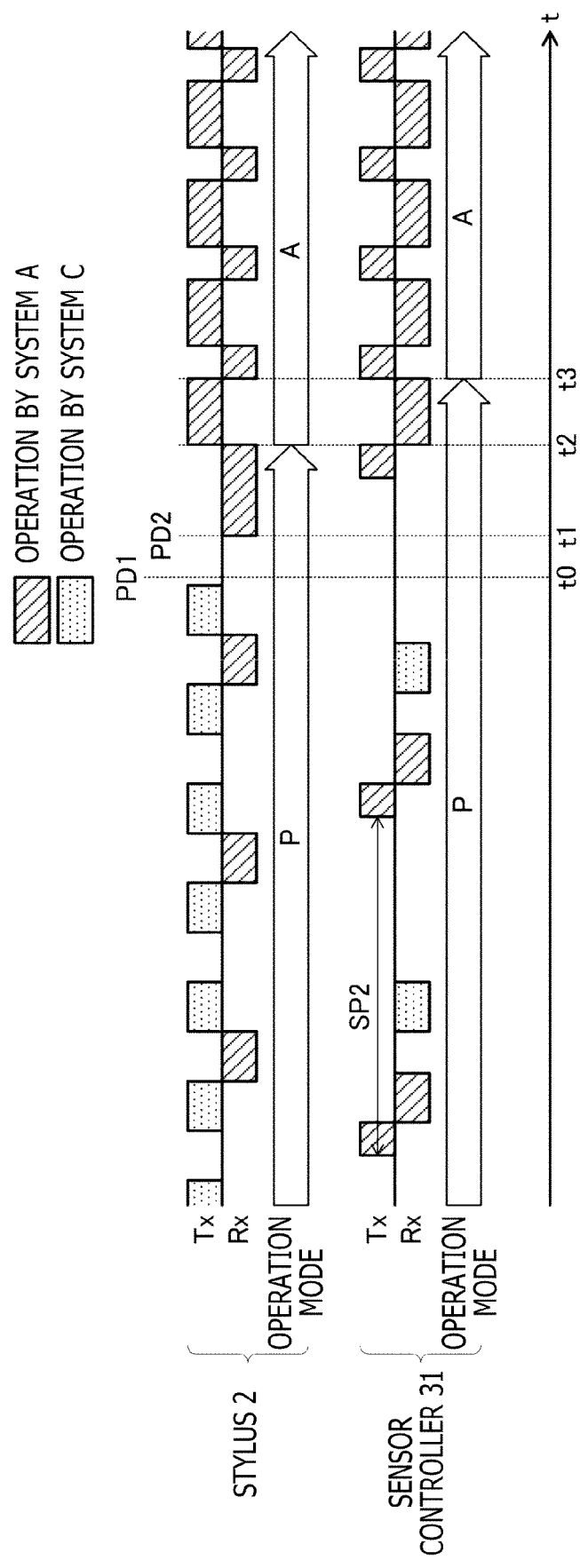
FIG. 16 is a diagram depicting signals transmitted and received between the stylus and the sensor controller according to the second embodiment of the present disclosure when the stylus and the sensor controller carry out operation according to the present embodiment.

FIG. 16 is a diagram depicting signals transmitted and received between the stylus 2 and the sensor controller 31 when the stylus 2 and the sensor controller 31 carry out operation according to the present embodiment. This diagram particularly depicts operation of the stylus 2 for preventing the start of communication pursuant to system C even when the clock time t1 is reached without a transition to operation mode A.

As depicted in FIG. 16, even when the operation mode of the stylus 2 is still unsettled mode P after the stylus 2 detects the second pen-down PD2 at the clock time t1, the stylus 2 does not make a transition to operation mode C, but immediately activates reception operation of the uplink signal US pursuant to system A. This reception operation is continued for at least a time equal to or longer than the transmission cycle of the sensor controller 31 (cycle SP2 depicted in the diagram) until the uplink signal US pursuant to system A is received. Due to this, if the sensor controller 31 transmits the uplink signal US pursuant to system A, the stylus 2 can surely receive the uplink signal US pursuant to system A unless the stylus 2 leaves the sensing range SR (FIG. 1). Therefore, communication pursuant to system C is not started and communication pursuant to system A can be started.

Figure 17:
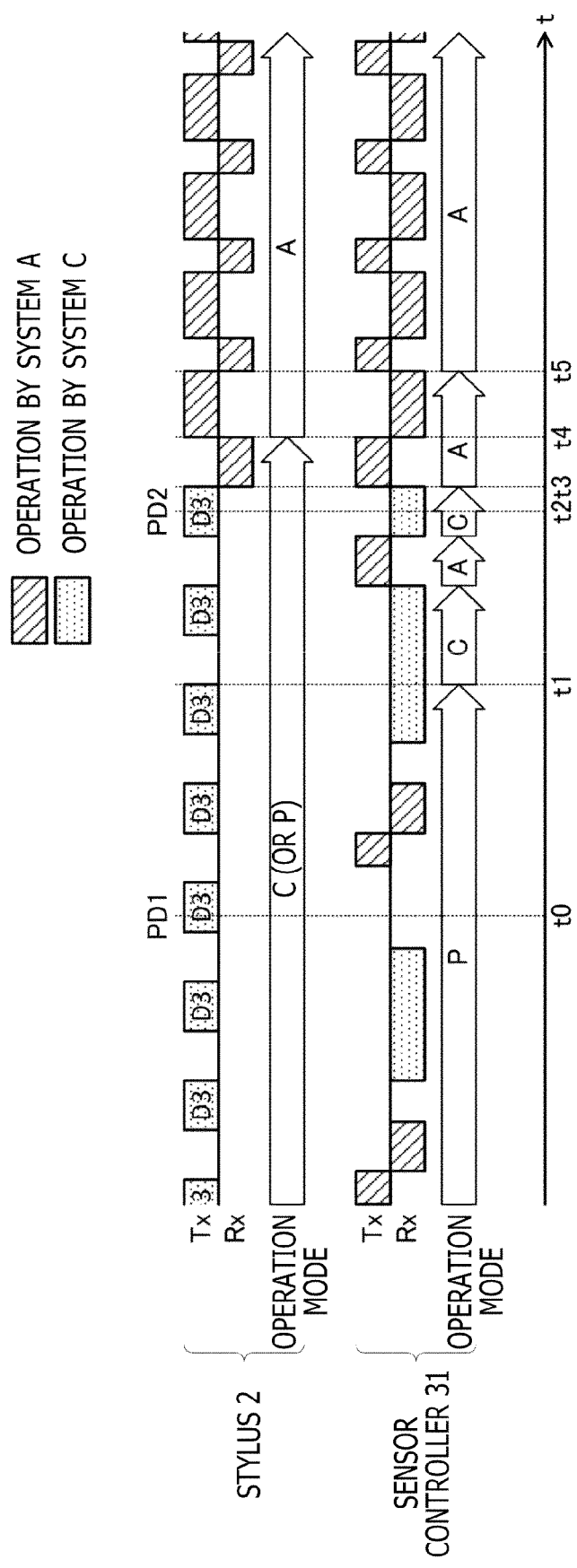
FIG. 17 is a diagram depicting signals transmitted and received between the stylus and the sensor controller according to the second embodiment of the present disclosure when the stylus and the sensor controller carry out operation according to the present embodiment.

FIG. 17 is also a diagram depicting signals transmitted and received between the stylus 2 and the sensor controller 31 according to the present embodiment. Particularly this diagram depicts operation of the stylus 2 and the sensor controller 31 for switching to communication pursuant to system A with the higher order of priority after communication pursuant to system C with the lower order of priority is started. When the stylus 2 and the sensor controller 31 according to the present embodiment are used, communication pursuant to system C is not started as described with reference to FIG. 16. Thus, basically the case in which the operation described here is necessary should not exist. However, it is also possible that the stylus 2 will fail to receive the uplink signal US for some reason and communication pursuant to system C will be started as a result (for example in the case in which, as in FIG. 18 to be described later, the stylus 2 fails to receive the uplink signal US pursuant to system A in a step S108 although the sensor controller 31 transmits it, and the stylus 2 decides its own operation mode as operation mode C in a step S111, or the like). Therefore, the operation described here may be necessary. Although being based on the premise that the stylus 2 is operating in operation mode C here, the operation described below is the same also when the stylus 2 is operating in unsettled mode P.

As depicted in FIG. 17, the stylus 2 that is operating in operation mode C continuously transmits the downlink signal DS (D3, first signal) including function information (specifically, all or part of the unique ID) indicating that the stylus 2 is compatible with systems A and C.

When the sensor controller 31 receives the downlink signal DS (D3) at the clock time t1 subsequent to the clock time t0 when the first pen-down PD1 has occurred, the operation mode of the sensor controller 31 changes to operation mode C. At this time, the sensor controller 31 determines which system the stylus 2 is compatible with, based on the unique ID included in the downlink signal DS (D3). Then, if determining that the stylus 2 is compatible with system A, from then on, the sensor controller 31 temporarily switches its own operation mode to operation mode A and carries out transmission of the uplink signal US (second signal) pursuant to system A every time the transmission of the downlink signal DS is interrupted. The uplink signal US thus transmitted has a role as an instruction to switch to operation mode A.

The stylus 2 attempts reception of the uplink signal US pursuant to system A at a timing when the sensor controller 31 will transmit the uplink signal US if the sensor controller 31 carries out the above-described operation. Specifically, the stylus 2 may carry out reception operation of the uplink signal US pursuant to system A in the transmission interval of the downlink signal DS. However, the consumption of the power supply 25 (FIG. 1) becomes large if the reception operation is invariably carried out in the transmission interval. Therefore, it is preferable to carry out the reception operation of the uplink signal US pursuant to system A, for example, in the transmission interval (between the clock time t3 and the clock time t4) of the downlink signal DS immediately after detection of the second pen-down PD2 (clock time t2), as depicted in FIG. 17. Of course, the reception operation of the uplink signal US pursuant to system A may be carried out at the stage before detection of the second pen-down PD2 (including the period between the first pen-down PD1 and the second pen-down PD2). This allows the stylus 2 to detect the uplink signal US pursuant to system A before the arrival of the clock time t2 (uplink signal US pursuant to system A located on the later side relative to the clock time t1 in FIG. 17).

When receiving the uplink signal US pursuant to system A at the clock time t4, the stylus 2 switches its own operation mode to operation mode A. Meanwhile, the sensor controller 31 attempts reception of the downlink signal DS pursuant to system A after transmitting the uplink signal US pursuant to system A several times. In the example of FIG. 17, this attempt is carried out after the second round of transmission. However, this attempt may be carried out after the first round of transmission or may be carried out after the third or subsequent round of transmission. Furthermore, the reception of the downlink signal DS pursuant to system A may be attempted plural times. As a result of attempting reception of the downlink signal DS pursuant to system A in this manner, the sensor controller 31 that has actually received the downlink signal DS pursuant to system A at the clock time t5 switches its own operation mode to operation mode A in response to this, and carries out operation in operation mode A from then on. Thereby, communication pursuant to system A is started between the stylus 2 and the sensor controller 31.

Figure 18:
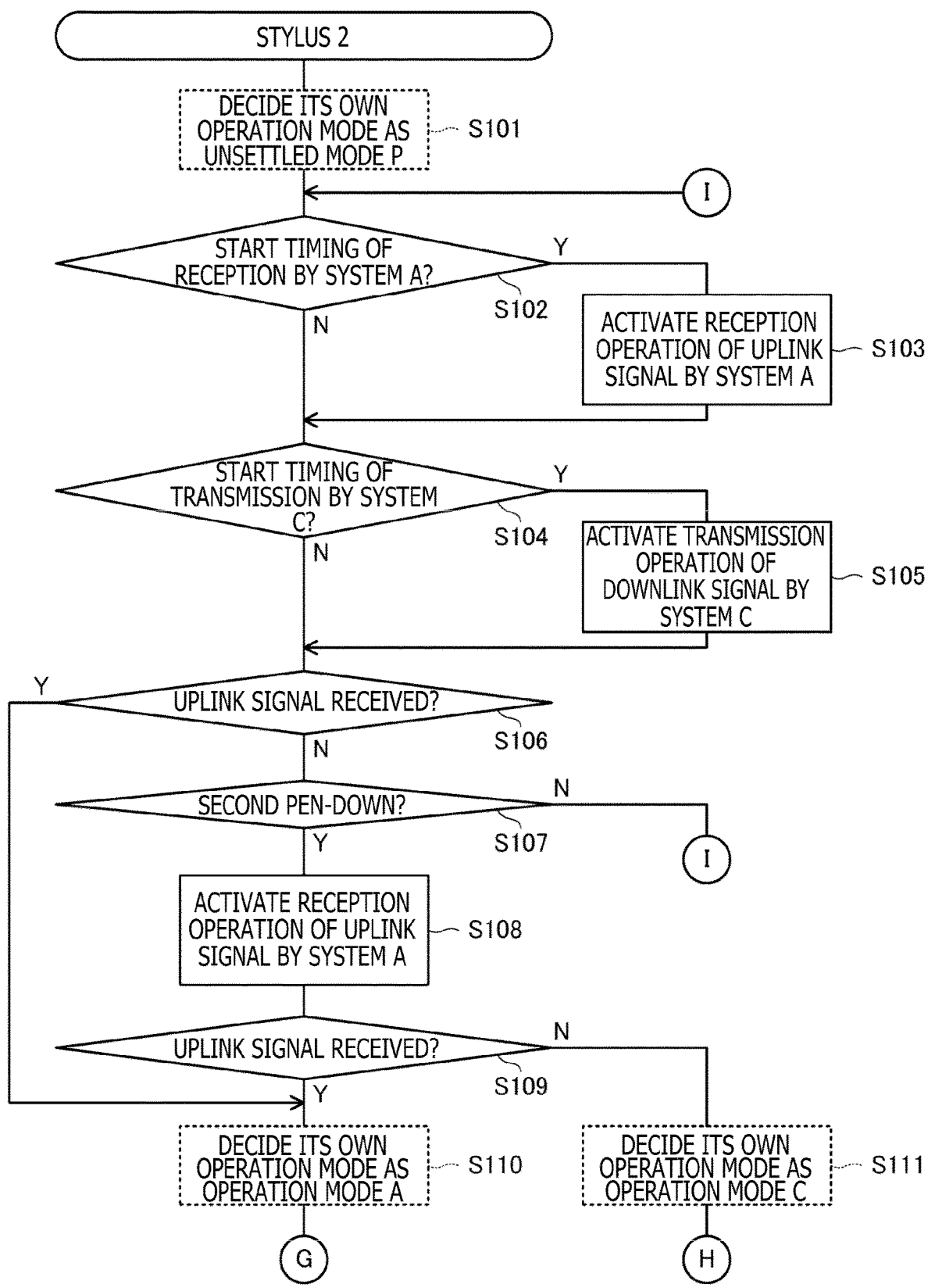
FIG. 18 is a processing flowchart depicting operation of the stylus according to the second embodiment of the present disclosure.
Figure 19:
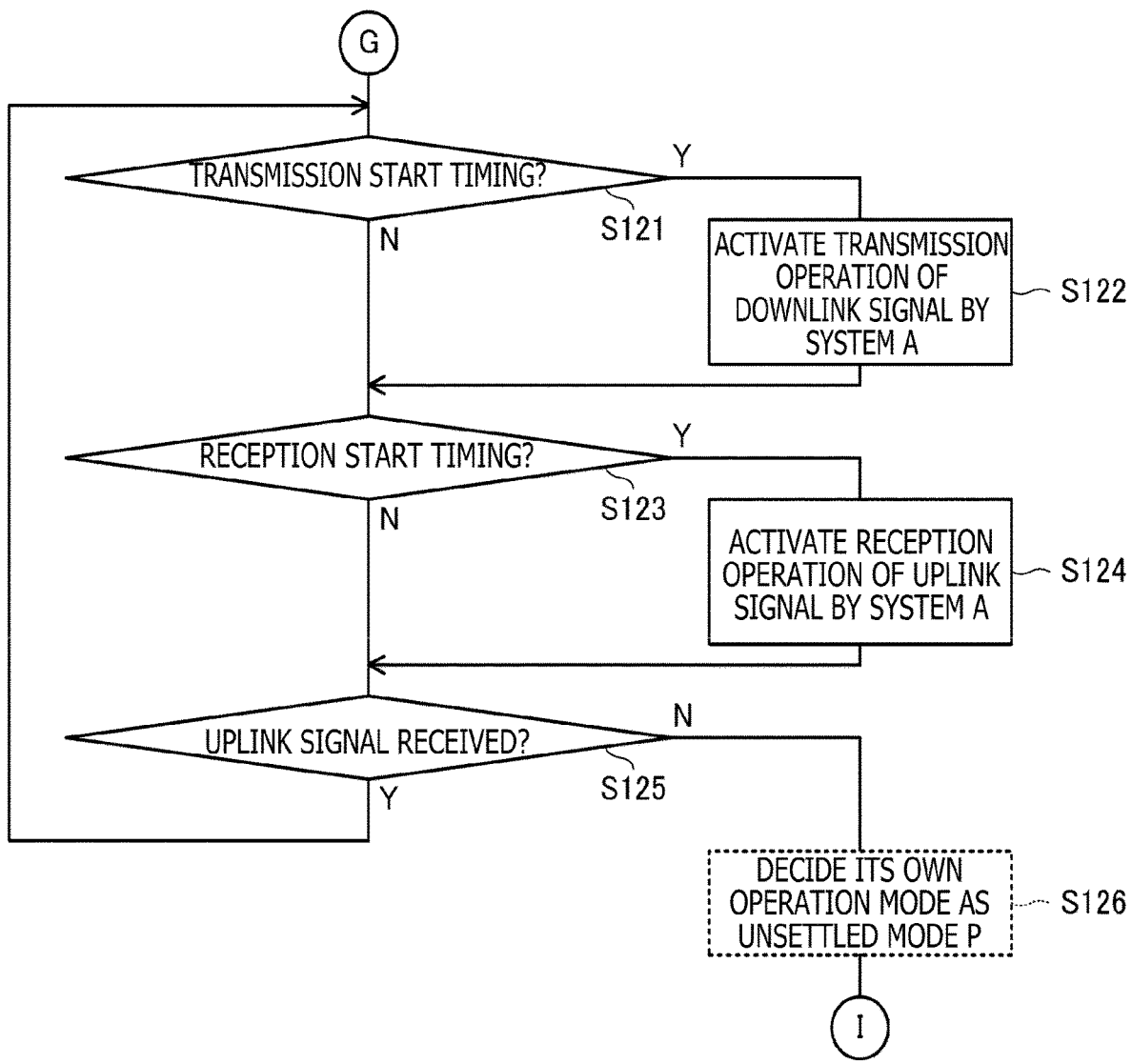
FIG. 19 is a processing flowchart depicting the operation of the stylus according to the second embodiment of the present disclosure.
Figure 20:
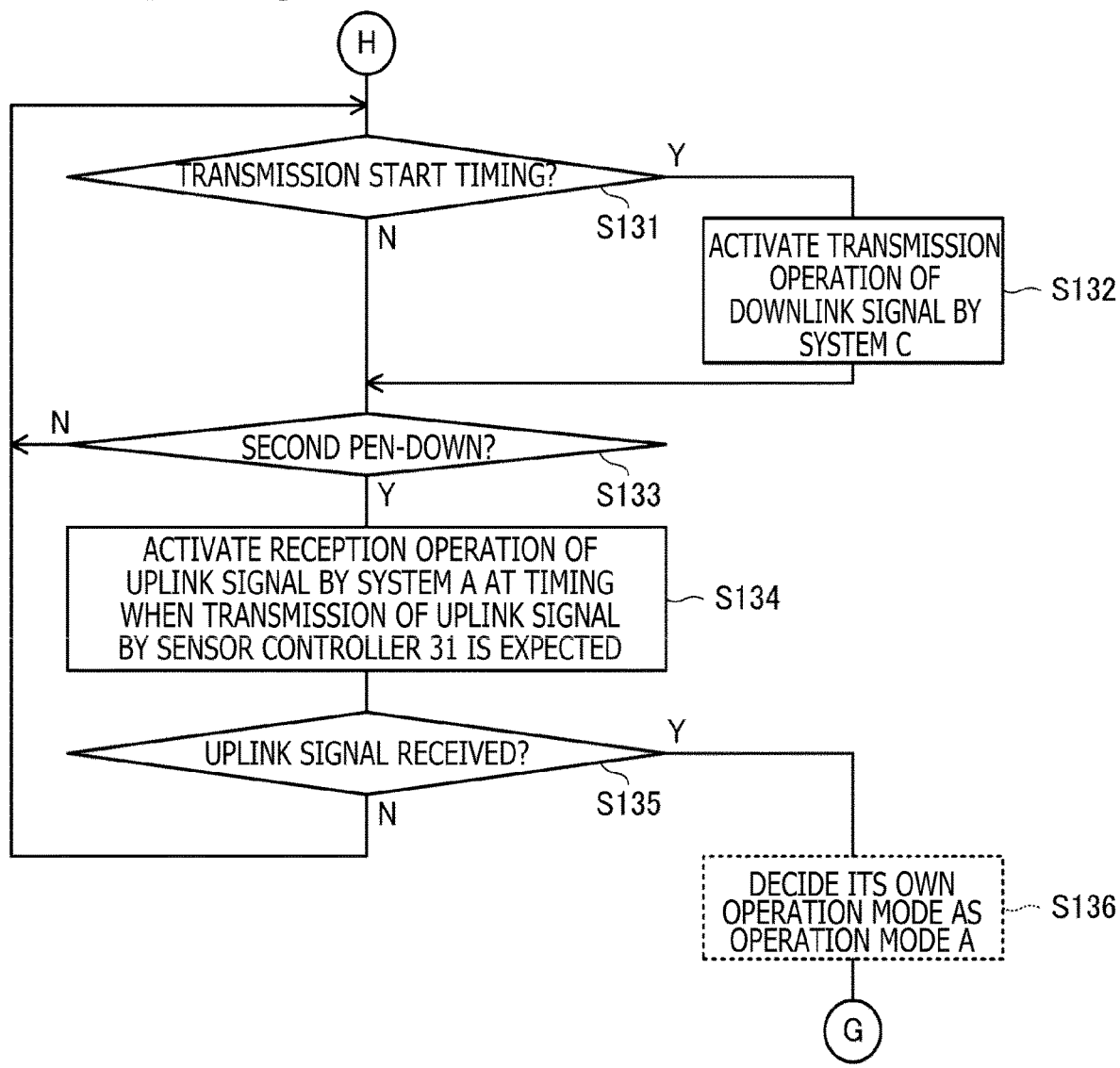
FIG. 20 is a processing flowchart depicting the operation of the stylus according to the second embodiment of the present disclosure.

FIG. 18 to FIG. 20 are processing flowcharts depicting the operation of the stylus 2 according to the present embodiment. With reference to these diagrams, the operation of the stylus 2 according to the present embodiment will be described in more detail below.

As depicted in FIG. 18, first the stylus 2 decides its own operation mode as unsettled mode P (step S101). Then, the stylus 2 detects each of the arrival of the start timing of reception pursuant to system A and the arrival of the start timing of transmission pursuant to system C (steps S102 and S104). If the start timing of reception pursuant to system A has arrived, the stylus 2 activates reception operation of the uplink signal US pursuant to system A (step S103). Furthermore, if the start timing of transmission pursuant to system C has arrived, the stylus 2 activates transmission operation of the downlink signal DS pursuant to system C (step S105).

Moreover, the stylus 2 determines whether or not the uplink signal US has been received by the reception operation started in the step S103 (step S106). If determining that the uplink signal US has been received (that is, if the uplink signal US pursuant to system A has been received), the stylus 2 switches its own operation mode to operation mode A (step S110).

The stylus 2 also determines whether or not the second pen-down PD2 has occurred concurrently with the determination in the step S106 (step S107). If determining that the second pen-down PD2 has occurred, the stylus 2 activates reception operation of the uplink signal US pursuant to system A separately from the periodic reception operation in the step S103 (step S108). This reception operation is continued for at least a time equal to or longer than the transmission cycle of the sensor controller 31 (cycle SP2 depicted in FIG. 16) until the uplink signal US pursuant to system A is received as described above. Then, the stylus 2 determines whether or not the uplink signal US has been received by this reception operation (step S109). If determining that the uplink signal US has been received, the stylus 2 switches its own operation mode to operation mode A (step S110). On the other hand, if determining that the uplink signal US has not been received, the stylus 2 switches its own operation mode to operation mode C (step S111). If determining that the second pen-down PD2 has not occurred in the step S107, the stylus 2 returns to the step S102 and continues the processing.

FIG. 19 depicts operation of the stylus 2 after operation in operation mode A is started. As depicted in this diagram, the stylus 2 detects each of the arrival of the transmission start timing and the arrival of the reception start timing (steps S121 and S123). Then, the stylus 2 activates transmission operation of the downlink signal DS pursuant to system A (step S122) if the transmission start timing has arrived, and activates reception operation of the uplink signal US pursuant to system A (step S124) if the reception start timing has arrived.

Furthermore, the stylus 2 determines whether or not the uplink signal US has been received by the reception operation started in the step S124 (step S125). If determining that the uplink signal US has been received, the stylus 2 returns to the step S121 and repeats the processing. On the other hand, if determining that the uplink signal US has not been received, the stylus 2 returns its own operation mode to unsettled mode P (step S126) and returns the processing to the step S102 in FIG. 18. This processing is executed in order to return the stylus 2 to unsettled mode P when the stylus 2 is separated from the touch surface 3t.

FIG. 20 depicts operation of the stylus 2 after operation in operation mode C is started. As depicted in this diagram, the stylus 2 detects the arrival of the transmission start timing (steps S131), and activates transmission operation of the downlink signal DS pursuant to system C (step S132) if the transmission start timing has arrived.

Furthermore, the stylus 2 also determines whether or not the second pen-down PD2 has occurred concurrently with the determination in the step S131 (step S133). If determining that the second pen-down PD2 has occurred, the stylus 2 activates reception operation of the uplink signal US pursuant to system A at the timing when transmission of the uplink signal US by the sensor controller 31 is expected (step S134). This timing when transmission is expected is a transmission interval of the downlink signal DS pursuant to system C, for example. Then, if the uplink signal US pursuant to system A has been received, the stylus 2 switches its own operation mode to operation mode A (step S136) and moves the processing to the step S121 in FIG. 19. If the uplink signal US pursuant to system A has not been received, the stylus 2 returns to the step S131 and continues the processing in operation mode C. Also when determining that the second pen-down PD2 has not occurred in the step S133, the stylus 2 returns to the step S131 and continues the processing.

FIG. 21 to FIG. 24 are processing flowcharts depicting processing executed by the sensor controller 31 according to the present embodiment. With reference to these diagrams, the operation of the sensor controller 31 according to the present embodiment will be described in more detail below.

Figure 21:
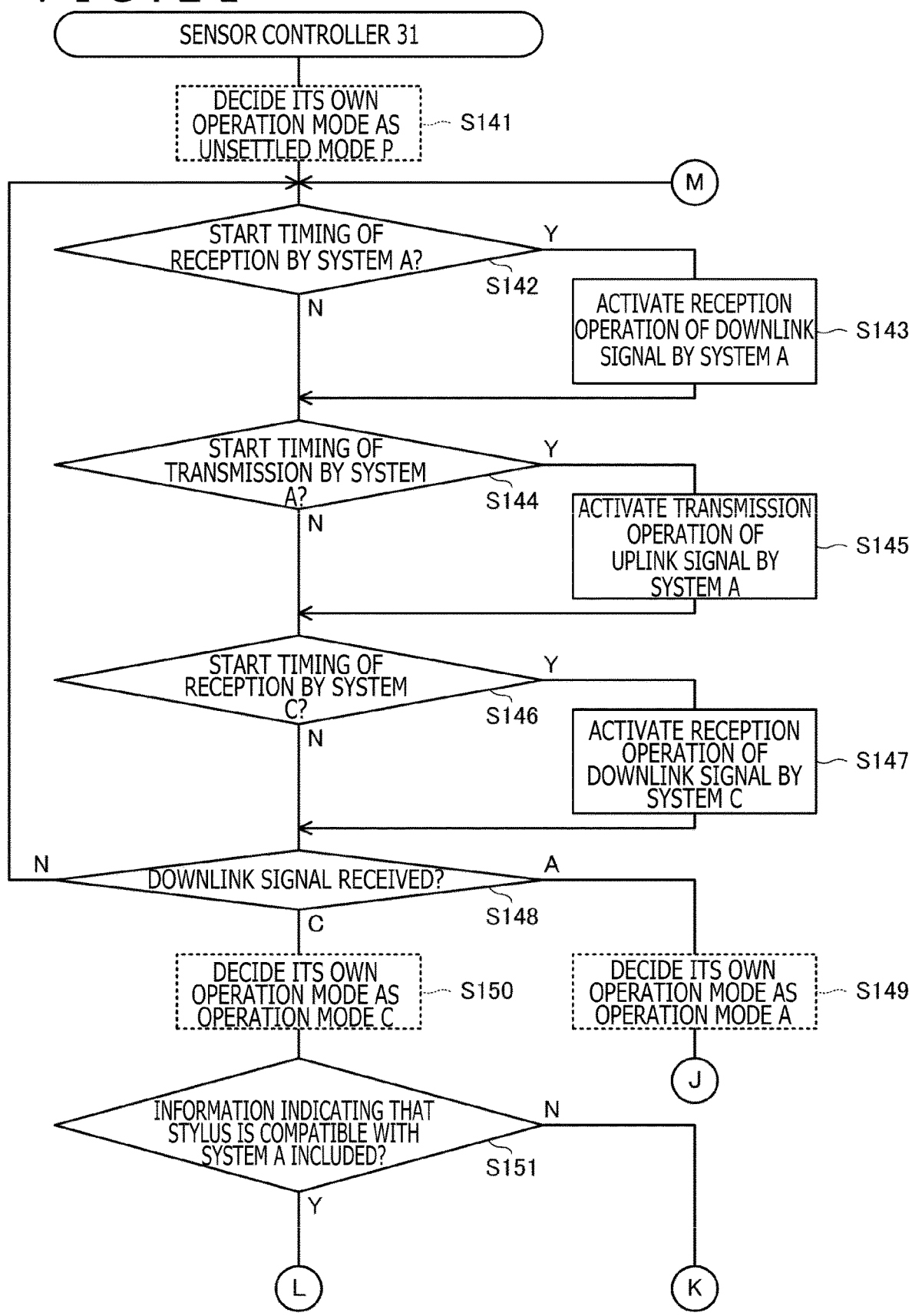
FIG. 21 is a processing flowchart depicting operation of the sensor controller according to the second embodiment of the present disclosure.

As depicted in FIG. 21, first the sensor controller 31 decides its own operation mode to unsettled mode P (step S141). Then, the sensor controller 31 detects each of the arrival of the start timing of reception pursuant to system A, the arrival of the start timing of transmission pursuant to system A, and the arrival of the start timing of reception pursuant to system C (steps S142, S144, and S146). If the start timing of reception pursuant to system A has arrived, the sensor controller 31 activates reception operation of the downlink signal DS pursuant to system A (step S143). Similarly, if the start timing of transmission pursuant to system A has arrived, the sensor controller 31 activates transmission operation of the uplink signal US pursuant to system A (step S145). If the start timing of reception pursuant to system C has arrived, the sensor controller 31 activates reception operation of the downlink signal DS pursuant to system C (step S147).

Furthermore, the sensor controller 31 determines whether or not the downlink signal DS has been received by the reception operation started in the step S143 or the step S147 (step S148). If determining that the downlink signal DS has been received by the reception operation started in the step S143 (that is, if the downlink signal DS pursuant to system A has been received), the sensor controller 31 switches its own operation mode to operation mode A (step S149). On the other hand, if determining that the downlink signal DS has been received by the reception operation started in the step S147 (that is, if the downlink signal DS pursuant to system C has been received), the sensor controller 31 switches its own operation mode to operation mode C (step S150) and thereafter determines whether or not function information (specifically, all or part of the unique ID) indicating that the stylus 2 is compatible with system A is included in the downlink signal DS (step S151). If determining that the function information indicating that the stylus 2 is compatible with system A is not included in the downlink signal DS, the sensor controller 31 moves the processing to a step S171 in FIG. 23 and starts normal operation pursuant to system C. On the other hand, if determining that the function information is included, the sensor controller 31 moves the processing to a step S181 in FIG. 24 and executes processing for causing the stylus 2 to make a transition to operation mode A.

Figure 22:
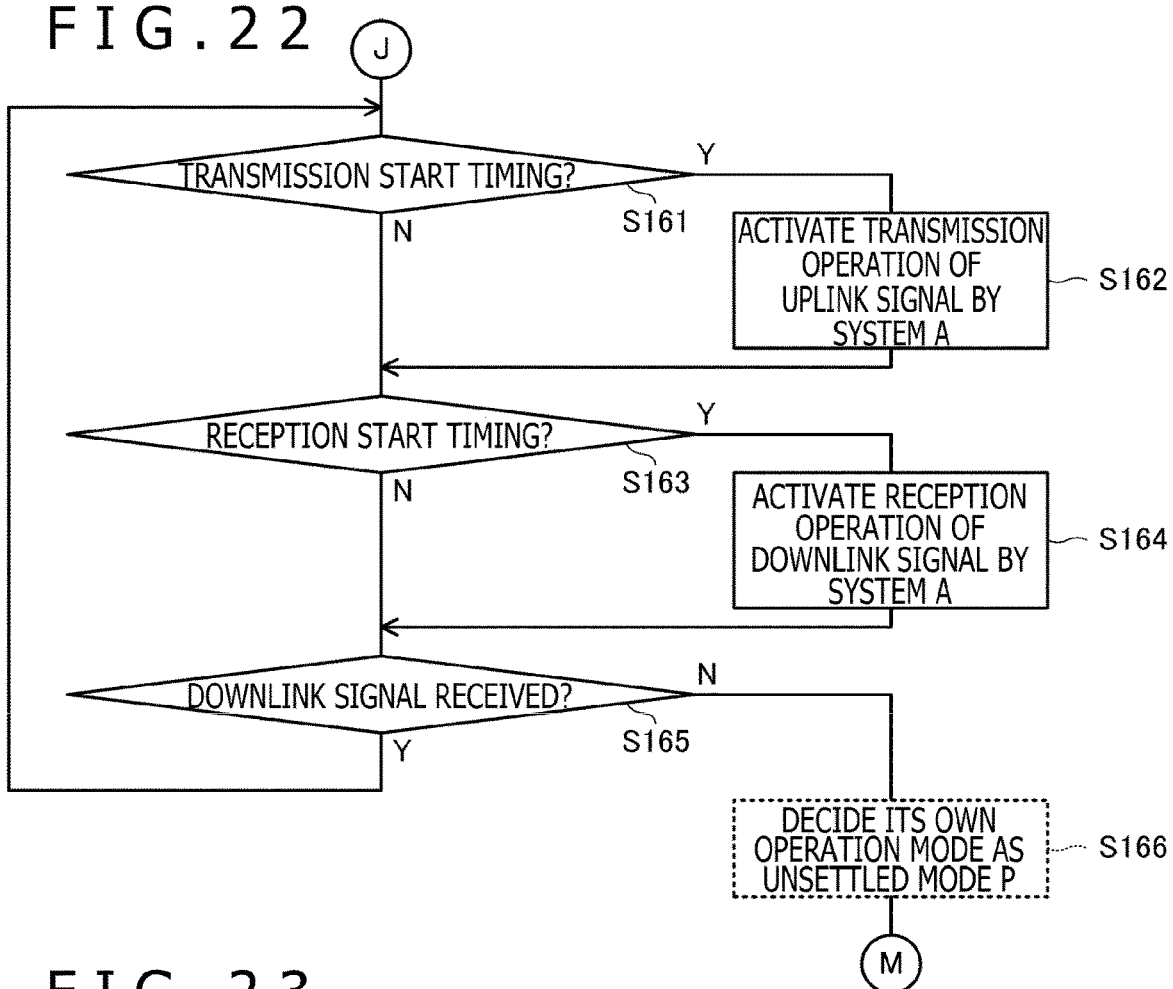
FIG. 22 is a processing flowchart depicting the operation of the sensor controller according to the second embodiment of the present disclosure.

FIG. 22 depicts operation of the sensor controller 31 after operation in operation mode A is started. As depicted in this diagram, the sensor controller 31 detects each of the arrival of the transmission start timing and the arrival of the reception start timing (steps S161 and S163). Then, the sensor controller 31 activates transmission operation of the uplink signal US pursuant to system A (step S162) if the transmission start timing has arrived, and activates reception operation of the downlink signal DS pursuant to system A (step S164) if the reception start timing has arrived.

Furthermore, the sensor controller 31 determines whether or not the downlink signal DS has been received by the reception operation started in the step S164 (step S165). If determining that the downlink signal DS has been received, the sensor controller 31 returns to the step S161 and repeats the processing. On the other hand, if determining that the downlink signal DS has not been received, the sensor controller 31 returns its own operation mode to unsettled mode P (step S166) and returns the processing to the step S142 in FIG. 21. This processing is executed in order to return the sensor controller 31 to unsettled mode P when the stylus 2 is separated from the touch surface 3t.

Figure 23:
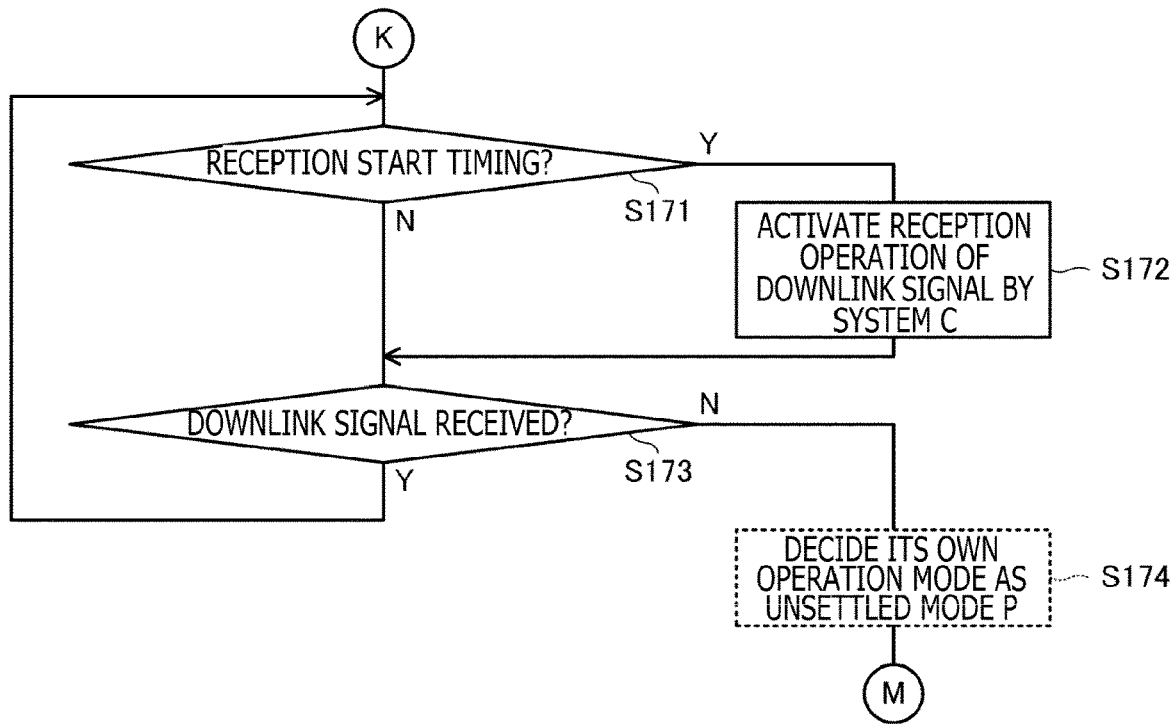
FIG. 23 is a processing flowchart depicting the operation of the sensor controller according to the second embodiment of the present disclosure.

FIG. 23 depicts operation of the sensor controller 31 after operation in operation mode C is started. As depicted in this diagram, the sensor controller 31 detects the arrival of the reception start timing (step S171). Then, if the reception start timing has arrived, the sensor controller 31 activates reception operation of the downlink signal DS pursuant to system C (step S172).

Furthermore, the sensor controller 31 determines whether or not the downlink signal DS has been received by the reception operation started in the step S172 (step S173). If determining that the downlink signal DS has been received, the sensor controller 31 returns to the step S171 and repeats the processing. On the other hand, if determining that the downlink signal DS has not been received, the sensor controller 31 returns its own operation mode to unsettled mode P (step S174) and returns the processing to the step S142 in FIG. 21. This processing is executed in order to return the sensor controller 31 to unsettled mode P when the stylus 2 is separated from the touch surface 3t, similarly to the step S166 in FIG. 22.

Figure 24:
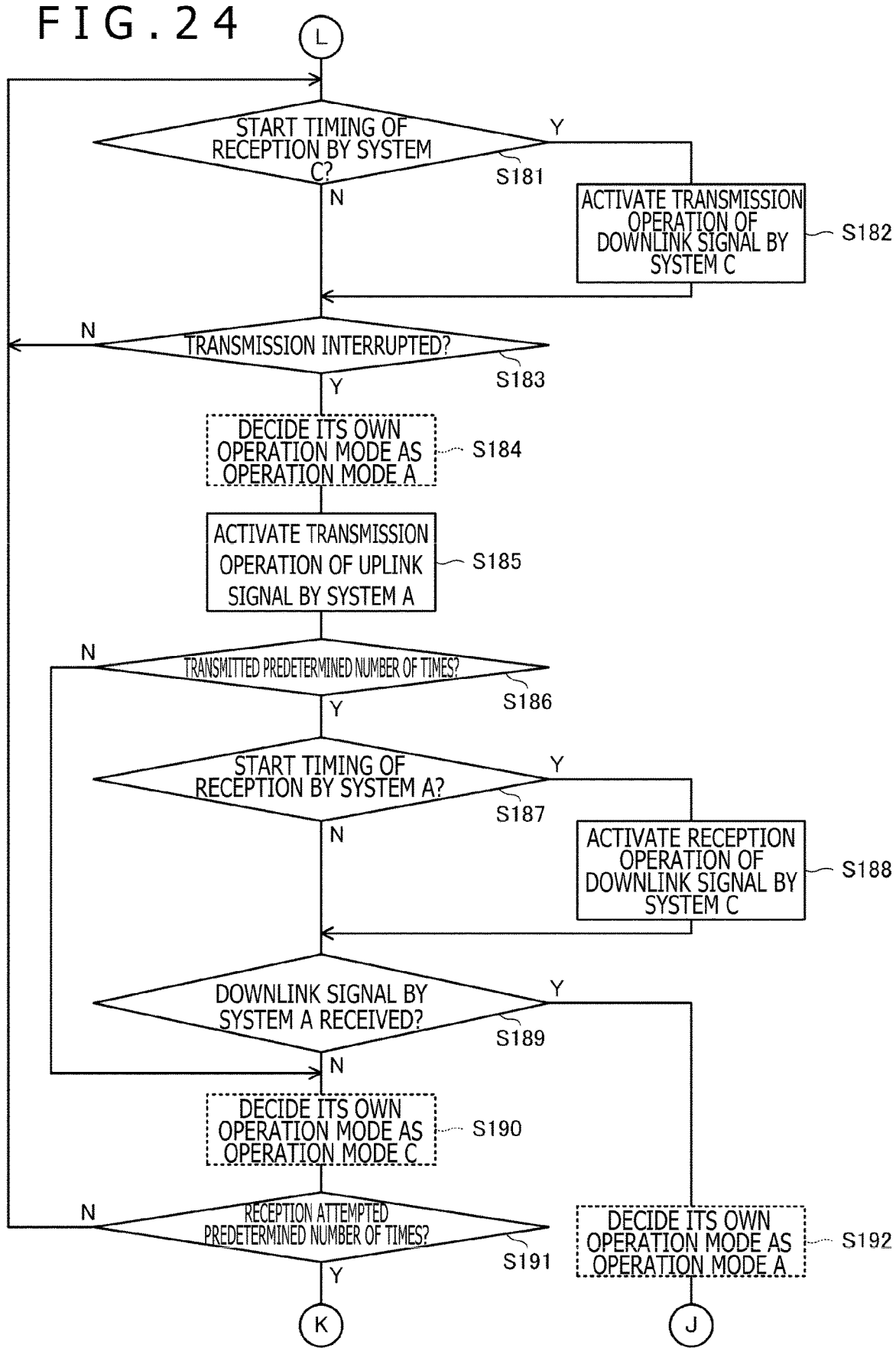
FIG. 24 is a processing flowchart depicting the operation of the sensor controller according to the second embodiment of the present disclosure.

FIG. 24 depicts operation of the sensor controller 31 when the function information indicating that the stylus 2 is compatible with system A (specifically, unique ID indicating that the stylus 2 is compatible with system A) is included in the downlink signal DS transmitted by the stylus 2 pursuant to system C in the step S151 in FIG. 21. In this case, the sensor controller 31 carries out operation for causing the stylus 2 to make a transition to operation mode A as described above.

Specifically, first the sensor controller 31 detects the arrival of the reception start timing of the downlink signal DS pursuant to system C (step S181). Then, if the reception start timing has arrived, the sensor controller 31 activates reception operation of the downlink signal DS pursuant to system C (step S182).

Furthermore, the sensor controller 31 determines whether or not transmission of the downlink signal DS has been interrupted (step S183). The sensor controller 31 carries out this determination when reception of the downlink signal DS has ended, and determines that the transmission has been interrupted if, at the timing, an interval equal to or longer than a predetermined time exists until the next reception start timing of the downlink signal DS begins.

If determining that the transmission has not been interrupted in the step S183, the sensor controller 31 returns to the step S181 and continues the processing. On the other hand, if determining that the transmission has been interrupted, the sensor controller 31 switches its own operation mode to operation mode A (step S184) and activates transmission operation of the uplink signal pursuant to system A (step S185). Then, the sensor controller 31 determines whether or not the number of times of transmission by this transmission operation has reached a predetermined number of times (step S186).

If determining that the predetermined number of times has been reached in the step S186, the sensor controller 31 detects the arrival of the reception start timing of the downlink signal DS pursuant to system A (step S187). This timing is the timing when the stylus 2 that has received the uplink signal US pursuant to system A starts transmission of the downlink signal DS pursuant to system A. If the reception start timing has arrived, the sensor controller 31 activates reception operation of the downlink signal DS pursuant to system A (step S188).

Subsequently, the sensor controller 31 determines whether or not the downlink signal DS has been received by the reception operation started in the step S188 (step S189). If determining that the downlink signal DS has been received, the sensor controller 31 switches its own operation mode to operation mode A (step S192) and thereafter moves the processing to the step S161 in FIG. 22. Thereby, communication pursuant to system A is started between the stylus 2 and the sensor controller 31.

If determining that the predetermined number of times has not been reached in the step S186 or if determining that the downlink signal DS has not been received in the step S189, the sensor controller 31 switches its own operation mode to operation mode C (step S190). Then, the sensor controller 31 determines whether or not the number of times the reception operation in the step S188 is attempted has reached a predetermined number of times (step S191), and moves the processing to the step S171 in FIG. 23 if determining that the predetermined number of times has been reached. This is equivalent to the case in which the downlink signal DS pursuant to system A is not received indefinitely and thus the sensor controller 31 abandons communication pursuant to system A, and communication pursuant to system C is started between the stylus 2 and the sensor controller 31. On the other hand, if determining that the predetermined number of times has not been reached in the step S191, the sensor controller 31 returns to the step S181 and continues the processing.

As described above, also with the method carried out by the stylus 2 according to the present embodiment, the stylus 2 can activate reception operation of a signal pursuant to system A immediately after contacting the touch surface 3t. Therefore, it becomes possible to shorten the time from the contact with the touch surface 3t to setting the stylus 2 to operation mode A.

Furthermore, according to the method carried out by the stylus 2 and the sensor controller 31 in accordance with the present embodiment, even when the operation mode of the stylus 2 is operation mode C, in which unidirectional transmission of a signal pursuant to system C is carried out, the operation mode of the stylus 2 can be switched to operation mode A by an instruction (specifically, transmission of the uplink signal US pursuant to system A) by the sensor controller 31 that has determined that the stylus 2 is compatible with system A. Therefore, it becomes possible to start communication pursuant to system A between the stylus 2 and the sensor controller 31.

Next, a third embodiment of the present disclosure will be described. The stylus 2 according to the present embodiment is different from the stylus 2 according to the first and second embodiments in that the stylus 2 is allowed to control the contents of indication by the indicator 26 according to its own operation mode. The other points and the configuration of the sensor controller 31 are the same as the first or second embodiment. Therefore, the description will be made with focus on the different point in the following.

The signal processor 24 of the stylus 2 according to the present embodiment controls the indicator 26 to carry out indication differently depending on the operation mode decided, as described in the first and second embodiments. That is, the indicator 26 is controlled to carry out indication differently between the case in which operation is carried out in the first operation mode in which a signal pursuant to the first system is transmitted, and the case in which operation is carried out in the second operation mode in which a signal pursuant to the second system is transmitted. Furthermore, the indicator 26 is controlled to carry out indication differently from both the first and second operation modes at the stage before it is decided whether operation is to be carried out in the first operation mode or operation is to be carried out in the second operation mode, i.e. in the case of carrying out operation in the above-described unsettled mode. According to this, for example in the signal processor 24 in the case of receiving the uplink signal US pursuant to the first system, its own operation mode is set to be the first operation mode. This causes the signal processor 24 to control the indicator 26 to carry out the indication corresponding to the first operation mode.

If the operation mode of the stylus 2 is switched every time the uplink signal US or the writing pressure is detected as described in the first and second embodiments, it becomes difficult for the user to understand which operation mode the stylus 2 is currently operating in. For example, when the electronic equipment 3 and the stylus 2 do not function despite that they are supposed to be in the same operation mode, or the like, it is impossible to understand what is happening. The stylus 2 according to the present embodiment allows the user to know which operation mode the stylus 2 (and sensor controller 31) is currently operating in by checking the indicator 26.

As concrete contents of indication by the indicator 26, various contents are conceivable. For example, if the indicator 26 is a light emitting diode that can emit light with plural colors, it is conceivable that the contents of indication by the indicator 26 are controlled in such a manner that the indicator 26 is lit up with colors different for each operation mode as follows for example: the indicator 26 is lit up with red in unsettled mode P and lit up with blue in the first operation mode and lit up with green in the second operation mode. Furthermore, if the indicator 26 is a light emitting diode that can emit light with a single color, it is conceivable that the contents of indication by the indicator 26 are controlled by combining blinking on and off as follows for example. Specifically, in unsettled mode P, the indicator 26 is repeatedly turned on and off at a predetermined cycle. In the first operation mode, the indicator 26 is turned on and off twice, at an interval shorter than the above-described predetermined cycle at the timing of switching to the first operation mode, and thereafter is kept off. In the second operation mode, the indicator 26 is turned on and off only once, at the timing of switching to the second operation mode, and thereafter is kept off.

Although preferred embodiments of the present disclosure are described above, the present disclosure is not limited to these embodiments at all and it is obvious that the present disclosure can be carried out in various modes without departing from the gist thereof.

For example, in the above-described embodiments, the stylus 2 receives the uplink signal US through the electrode 21 (FIG. 1). However, the stylus 2 may receive the uplink signal US by a separate wireless communication measure such as Bluetooth (registered trademark) for example. Furthermore, it suffices for the uplink signal US (signal pursuant to the first system) to be a signal that can be detected by the stylus 2, which includes the case in which the sensor controller 31 that carries out detection of a finger touch using mutual capacitance between transmitting electrode and receiving electrode uses a transmission signal supplied to the transmitting electrode as the uplink signal US.

Furthermore, in the above-described embodiments, if the signal that should be received is not received after the start of operation in a certain operation mode, the stylus 2 and the sensor controller 31 immediately return to unsettled mode P (step S26 in FIG. 9, step S38 in FIG. 10, step S66 in FIG. 12, step S78 in FIG. 13, step S126 in FIG. 19, step S166 in FIG. 22, step S174 in FIG. 23). However, instead of immediately returning to unsettled mode P, the stylus 2 and the sensor controller 31 may return to unsettled mode P if failure in reception occurs a predetermined number of times, for example.

In the above-described embodiments, switching between plural systems in an optimizing manner is described. However, it is obvious that the present disclosure can be applied also to the case of switching from an operation mode in which equipment operates in an old version as the second system to another operation mode in which equipment operates in a newer version by using function information.

What is claimed is:

1. A method carried out by a stylus, the stylus being a dual stylus capable of transmitting a signal pursuant to a first system and a signal pursuant to a second system and capable of receiving at least a signal pursuant to the first system, the dual stylus being capable of detecting a writing pressure applied to a stylus tip, the method comprising:

detecting, by the stylus, contact between the stylus and a touch surface based on the writing pressure detected by the stylus;

activating, by the stylus, a signal reception operation of the stylus pursuant to the first system for a predetermined time period, in response to detection of the contact between the stylus and the touch surface;

in response to the stylus receiving a signal, from an external device including the touch surface, pursuant to the first system in the predetermined time period, setting an operation mode of the stylus to a first operation mode, in which signals are transmitted and received by the stylus pursuant to the first system; and in response to the operation mode of the stylus being not settled, repeatedly performing a signal reception operation of the stylus pursuant to the first system and a signal reception operation of the stylus pursuant to the second system, setting the operation mode of the stylus to the first operation mode in response to receiving a signal transmitted from the external device pursuant to the first system, and setting the operation mode of the dual stylus to a second operation mode in response to receiving a signal transmitted from the external device pursuant to the second system, wherein the second system supports bidirectional communication between the stylus and the external device.

2. The method according to claim 1, comprising:
before the activating step, repeatedly performing, by the stylus, the signal reception operation of the stylus pursuant to the first system for the predetermined time period, interspersed between break periods during which the signal reception operation of the stylus is not carried out.

3. A method carried out by a dual stylus and a dual controller, wherein the dual stylus is capable of transmitting a signal pursuant to a first system and a signal pursuant to a second system to the dual controller and capable of receiving at least a signal pursuant to the first system from the dual controller, and the dual controller is capable of receiving a signal pursuant to the first system and a signal pursuant to the second system from the dual stylus and capable of transmitting at least a signal pursuant to the first system to the dual stylus, the method comprising:

transmitting, from the dual stylus to the dual controller, a first signal pursuant to the second system, wherein the first signal includes function information indicating that the dual stylus is compatible with the first system;

transmitting, from the dual controller to the dual stylus in response to the first signal, a second signal instructing the dual stylus to switch to a first operation mode; and switching, by the dual stylus in response to the second signal, an operation mode of the dual stylus to the first operation mode, in which signals are transmitted and received by the dual stylus pursuant to the first system, wherein the second system supports bidirectional communication between the dual stylus and the dual controller, and the dual stylus, in response to the operation mode of the dual stylus being not settled, repeatedly performs a signal reception operation of the dual stylus pursuant to the first system and a signal reception operation of the dual stylus pursuant to the second system, sets the operation mode of the dual stylus to the first operation mode in response to receiving a signal transmitted from the dual controller pursuant to the first system, and sets the operation mode of the dual stylus to a second operation mode in response to receiving a signal transmitted from the dual controller pursuant to the second system.

4. The method according to claim 3, comprising:
switching, by the dual controller in connection with transmitting the second signal to the dual stylus, an operation mode of the dual controller to the first operation mode.

5. The method according to claim 3, wherein
the function information includes a part or all of a unique identification (ID) of the dual stylus, and
the unique identification is information used in common in both the first system and the second system.

6. The method according to claim 3, wherein
the dual controller transmits to the dual stylus the second signal pursuant to the second system.

7. The method according to claim 3, wherein
the second signal includes a command that instructs the dual stylus to switch to the first operation mode.

8. The method according to claim 3, wherein
after transmitting the second signal to the dual stylus, the dual controller switches an operation mode of the dual controller to the first operation mode at a timing at which the dual stylus transitions to the first operation mode.

9. The method according to claim 3, wherein
the dual stylus is capable of detecting a writing pressure applied to a stylus tip, and
the method includes:
detecting, by the dual stylus, contact between the dual stylus and a touch surface of the dual controller based on the writing pressure detected by the dual stylus;
activating, by the dual stylus in response to detection of the contact between the dual stylus and the touch surface, a signal reception operation of the dual stylus pursuant to the first system; and
setting, by the dual stylus in response to receiving a signal transmitted from the dual controller pursuant to the first system in the signal reception operation, the operation mode of the dual stylus to the first operation mode.

10. The method according to claim 9, comprising:
setting, by the dual stylus, the operation mode of the dual stylus to the second operation mode, in which signals are transmitted and received by the dual stylus pursuant to the second system, in response to not receiving a signal transmitted from the dual controller pursuant to the first system in the signal reception operation.

11. The method according to claim 10, wherein
the dual controller transmits to the dual stylus the second signal pursuant to the first system.

12. The method according to claim 11, wherein
the dual controller stands by while signal transmission from the dual stylus to the dual controller pursuant to the second system continues, and
in response to the signal transmission from the dual stylus to the dual controller pursuant to the second system being interrupted, the dual controller commences signal transmission to the dual stylus pursuant to the first system.

13. The method according to claim 12, wherein
in response to the signal transmission from the dual stylus to the dual controller pursuant to the second system being interrupted, the dual controller transmits to the dual stylus the second signal pursuant to the first system.

14. A dual stylus capable of transmitting a signal pursuant to a first system and a signal pursuant to a second system and capable of receiving at least a signal pursuant to the first system, the dual stylus comprising:
a detector configured to detect a writing pressure applied to a stylus tip; and
a controller, which is coupled to the detector and which, in operation,
activates a signal reception operation of the dual stylus pursuant to the first system for a predetermined time period in response to detection of contact between the dual stylus and a touch surface based on the writing pressure detected by the detector,
in response to the dual stylus receiving a signal, from an external device including the touch surface, pursuant to the first system in the predetermined time period, sets an operation mode of the dual stylus to a first operation mode, in which signals are transmitted and received by the dual stylus pursuant to the first system, and in response to the operation mode of the dual stylus being not settled, repeatedly performs a signal reception operation of the dual stylus pursuant to the first system and a signal reception operation of the dual stylus pursuant to the second system, sets the operation mode of the dual stylus to the first operation mode in response to receiving a signal transmitted from the external device pursuant to the first system, and sets the operation mode of the dual stylus to a second operation mode in response to receiving a signal transmitted from the external device pursuant to the second system, wherein the second system supports bidirectional communication between the dual stylus and the external device.

15. A dual stylus capable of transmitting a signal pursuant to a first system and a signal pursuant to a second system to an external touch sensor controller and capable of receiving at least a signal pursuant to the first system from the external touch sensor controller, the dual stylus comprising:

a controller, which, in operation, transmits a first signal pursuant to the second system to the external touch sensor controller, wherein the first signal includes function information indicating that the dual stylus is compatible with the first system, after transmitting the first signal and in response to a second signal transmitted from the external touch sensor controller instructing the dual stylus to switch to a first operation mode, switches an operation mode of the dual stylus to the first operation mode in which the dual stylus transmits and receives signals pursuant to the first system, and in response to the operation mode of the dual stylus being not settled, repeatedly performs a signal reception operation of the dual stylus pursuant to the first system and a signal reception operation of the dual stylus pursuant to the second system, sets the operation mode of the dual stylus to the first operation mode in response to receiving a signal transmitted from the external touch sensor controller pursuant to the first system, and sets the operation mode of the dual stylus to a second operation mode in response to receiving a signal transmitted from the external touch sensor controller pursuant to the second system, wherein the second system supports bidirectional communication between the dual stylus and the external touch sensor controller.

16. A dual stylus capable of transmitting a signal pursuant to a first system and a signal pursuant to a second system to an external touch sensor controller and capable of receiving at least a signal pursuant to the first system from the external touch sensor controller, the dual stylus comprising:

an indicator; and a controller, which is coupled to the indicator and which, in operation, determines an operation mode of the dual stylus to be one of a first operation mode, in which signal transmission operation of the dual stylus is performed pursuant to the first system, and a second operation mode, in which signal transmission operation of the dual stylus is performed pursuant to the second system, controls the indicator to perform indication differently between when the determined operation mode is the first operation mode and when the determined operation mode is the second operation mode, and in response to the operation mode of the dual stylus being not settled, repeatedly performs a signal reception operation of the dual stylus pursuant to the first system and a signal reception operation of the dual stylus pursuant to the second system, sets the operation mode of the dual stylus to the first operation mode in response to receiving a signal transmitted from the external touch sensor controller pursuant to the first system, and sets the operation mode of the dual stylus to the second operation mode in response to receiving a signal transmitted from the external touch sensor controller pursuant to the second system, wherein the second system supports bidirectional communication between the dual stylus and the external touch sensor controller.

17. The dual stylus according to claim 16, wherein the controller, in response to receiving a signal transmitted from the external touch sensor controller pursuant to the first system, controls the indicator to perform indication pursuant to the first operation mode.

18. The dual stylus according to claim 16, wherein the controller, prior to determining the operation mode of the dual stylus to be one of the first operation mode and the second operation mode, controls the indicator to perform indication differently from both when the dual stylus is in the first operation mode and from when the dual stylus is in the second operation mode.

* * * * *